(12) United States Patent
Dadkhah Tehrani et al.

(10) Patent No.: US 12,190,745 B2
(45) Date of Patent: Jan. 7, 2025

(54) CONTROLLING AIRCRAFT TO AVOID TERRAIN OBSTACLES USING REDUCED ORDER CLOSED LOOP MODELS

(71) Applicant: Lockheed Martin Corporation, Bethesda, MD (US)

(72) Inventors: Navid Dadkhah Tehrani, Providence, RI (US); Kwok K. Cheng, Shelton, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 142 days.

(21) Appl. No.: 17/690,864

(22) Filed: Mar. 9, 2022

(65) Prior Publication Data

US 2023/0290256 A1  Sep. 14, 2023

(51) Int. Cl.
G08G 5/04  (2006.01)
G08G 5/00  (2006.01)

(52) U.S. Cl.
CPC ........... *G08G 5/045* (2013.01); *G08G 5/0026* (2013.01); *G08G 5/003* (2013.01); *G08G 5/006* (2013.01); *G08G 5/0069* (2013.01); *G08G 5/0086* (2013.01)

(58) Field of Classification Search
CPC ...... G08G 5/045; G08G 5/0026; G08G 5/003; G08G 5/006; G08G 5/0069; G08G 5/0086
See application file for complete search history.

(56) References Cited

U.S. PATENT DOCUMENTS

| 5,213,283 | A | * | 5/1993 | Gold | G05D 1/0858 |
| | | | | | 244/184 |
| 10,017,263 | B2 | | 7/2018 | Litwinowicz et al. | |
| 10,453,351 | B2 | | 10/2019 | Choi et al. | |
| 2012/0095621 | A1 | | 4/2012 | Zhu et al. | |
| 2017/0291711 | A1 | * | 10/2017 | Litwinowicz | B64C 27/006 |

(Continued)

FOREIGN PATENT DOCUMENTS

JP  2007500856 A  *  1/2007  ........... G01S 13/524

OTHER PUBLICATIONS

Machine Translation of JP2007500856A PDF File Name: "JP2007500856A_Machine_Translation.pdf".*

(Continued)

*Primary Examiner* — Grant Moubry
*Assistant Examiner* — Ruben Picon-Feliciano
(74) *Attorney, Agent, or Firm* — Foley & Lardner LLP

(57) ABSTRACT

This disclosure relates to apparatuses, systems, and methods for controlling an aircraft. A computing system may identify a first command signal received via a flight control at a time point to control navigation of the aircraft through an environment. The computing system may attenuate the first command signal using a fade function over a time window relative to the time point to generate a second command signal. The computing system may input the second command signal to a model to generate predicted paths for the aircraft through the environment over the time window. The computing system may determine that at least one predicted path intersects with an obstacle in the environment during the time window. The computing system may generate a location to which to navigate the aircraft to avoid the obstacle. The computing system may perform an action to direct the aircraft to the location.

20 Claims, 15 Drawing Sheets

(56) References Cited

U.S. PATENT DOCUMENTS

| | | |
|---|---|---|
| 2018/0101180 A1* | 4/2018 | Greenfield .............. B64C 27/56 |
| 2020/0010194 A1 | 1/2020 | Liu et al. |
| 2020/0064835 A1 | 2/2020 | Prosser et al. |
| 2020/0134900 A1* | 4/2020 | Malviya ................ G08G 5/0052 |
| 2021/0318697 A1 | 10/2021 | Tehrani et al. |

OTHER PUBLICATIONS

Barfield et al., "All Terrain Ground Collision Avoidance and Maneuvering Terrain Following for Automated Low Level Night Attack", Proceedings of the IEEE/AIAA 11th Digital Avionics Systems Conference, Oct. 5-8, 1992, Seattle, Washington, Oct. 1992, pp. 13-18.

Extended European Search Report on European Patent Application No. 23155060.9 dated May 30, 2023 (11 pages).

* cited by examiner

CONTROLLING AIRCRAFT TO AVOID TERRAIN OBSTACLES USING REDUCED ORDER CLOSED LOOP MODELS

TECHNICAL FIELD

This disclosure relates to controlling aircraft to avoid terrain obstacles, and more generally, flight control computing systems.

BACKGROUND

A vehicle may navigate through an environment along a path from a start point to another point. While navigating along the path, the vehicle may come across obstacles in the environment.

SUMMARY

A vehicle may have a flight control computing system to control navigation of the vehicle through an environment from an initial point to a terminal point along a flight path in accordance with model following control laws. As the vehicle traverses the environment, the computing system may receive command signals received from inceptors as directed by an operator to direct the navigation of the vehicle. The command signals may be to set or adjust a velocity (e.g., longitudinal, lateral, and vertical velocities), acceleration (e.g., longitudinal, lateral, and vertical accelerations), and orientation (e.g., roll, pitch, and yaw rates) of the vehicle. In conjunction, the computing system may instrument various sensory data on the components of the vehicle (e.g., the engine, wing, and battery). The computing system may feed the command signals and sensory data to a myriad of models configured to assist in the generation of flight trajectories for a flight path of the vehicle. Using these models, the computing system may generate flight trajectories for the vehicle to navigate through the environment accounting for the operator input through the inceptors. The computing system may feed the command signals calculated by the models to the navigation components to effectuate the flight path through the environment.

While these models can be used to calculate flight trajectories, one issue with these models may be their computational complexity. For example, an inverse plant function to accept total commanded pitch, roll, and yaw rates, and shape the commanded rates using an inverse model for each axis of aircraft dynamics in full order. In conjunction, a feedback model may also take the total commanded pitch, roll, and yaw rates along with a commanded velocity to calculate velocity error also in full order to maintain velocity. The outputs of these two models may be combined by a mixing model to combine control commands to ensure that the response remains on axes. The computational complexity arising from the numerous steps of calculations with the multitude of variables may lead to latency in calculations of the flight trajectory by the flight control computing system, which may introduce delays in the flight control computing system updating a flight trajectory to avoid an obstacle. These models may thus be unsuitable for generating flight trajectories to avoid terrain obstacles especially when the vehicle is traveling at high speeds, given the short response times in order to prevent collision with such obstacles.

To address these and other challenges, the flight control computing system of this technical solution can use a reduced-order closed-loop model to generate flight trajectories for the vehicle. The reduced-order model may approximate the input and output behavior of one or more of the models, such as the inverse plant function, the feedback model, and the mixing model. The reduced-order model may have a lower number in terms of order compared to the models described above. In addition, the computing system may apply a fade function for each command signal. The fade function may apply a weight over a time window relative to a time point at which the command signal was received from the inceptors. Upon the application of the fade function, the computing system may feed the command signals to the reduced-order model. The computing system may use the reduced-order model to process the command signals to generate a flight trajectory with which to navigate the vehicle away from an obstacle.

With the determination, the computing system may determine whether the flight trajectory of the vehicle intersects with an obstacle in the environment. The computing system may detect various obstacles from terrain data regarding the environment. Depending on a speed of the vehicle, the computing system may find a goal point to which to navigate the aircraft to avoid the obstacle upon determining that the flight trajectory intersects with the obstacle. When the vehicle is operating in a low-speed mode (e.g., below a threshold speed), the computing system may identify the location to hover the aircraft relative to the obstacle in the environment. Otherwise, when the vehicle is operating in a high-speed mode (e.g., above a threshold speed), the computing system may identify one or more goal points to navigate the vehicle to evade the obstacle by a clearance distance. The computing system may automatically feed the command signals to the navigation components of the vehicle to avoid the obstacle, without any operator input through the inceptors.

By using the reduced-order closed-loop model, the flight control computing system may be able to more quickly calculate predicted flight trajectories using the command signals inputted by the operator via the inceptors, relative to the full-order model. Furthermore, because the reduced-order model is able to calculate faster, the outputted flight trajectories may be suitable for use for a terrain obstacle avoidance. Using the output and terrain data, the computing system may determine whether the flight trajectory that the vehicle is navigating along intersects with the obstacle in the environment. In this manner, the utility of the flight control computing system may be further expanded to trajectory prediction and the obstacle avoidance, thereby increasing the odds of accomplishing the mission objectives of the flight.

At least one aspect of this technical solution is directed to apparatuses, systems, and methods for controlling an aircraft. A computing system may have one or more processors coupled with memory on an aircraft. The computing system may identify a first plurality of command signals derived from an input received via a flight control at a time point to control navigation of the aircraft through an environment. The computing system may attenuate the first plurality of command signals using a fade function over a time window relative to the time point to generate a second plurality of command signals. The computing system may input the second plurality of command signals to a model to generate one or more predicted paths for the aircraft through the environment over the time window. The computing system may determine that at least one predicted path of the one or more predicted paths intersects with an obstacle in the environment during the time window. The computing system may generate a location to which to navigate the aircraft to avoid the obstacle responsive to determining that the at least one predicted path intersects with the obstacle. The computing system may perform an action to direct the aircraft to the location.

In some embodiments, the model may approximate at least one of an inverse plant model, a corrective feedback model, a control mixing model, or a servos control unit in a flight control system for the aircraft. In some embodiments, the computing system may input the second plurality of command signals to the model, at an interval of time, to generate the one or more predicted paths for the aircraft through the environment.

In some embodiments, the computing system may compare the at least one predicted path for the aircraft with a world model for the environment to determine that the at least one predicted path intersects the obstacle. In some embodiments, the computing system may identify whether the aircraft is operating in at least one of a first mode or a second mode based on a speed of the aircraft, responsive to determining that the at least one predicted path intersects with the obstacle.

In some embodiments, the computing system may generate a potential field map using a world model for the environment. The potential field map may identify whether the environment is occupied or free at an altitude of the aircraft. In some embodiments, the computing system may generate the location to hover the aircraft relative to the obstacle in the environment, responsive to a speed of the aircraft being below a threshold. In some embodiments, the computing system may generate a plurality of waypoints through which to navigate the aircraft to evade the obstacle by at least a clearance distance, responsive to a speed of the aircraft being above a threshold.

In some embodiments, the computing system may provide an output to an operator of the aircraft to navigate the aircraft to the location to avoid the obstacle. The output may include at least one of a visual cue, an audio cue, or a tactile cue. In some embodiments, the computing system may switch, without corrective input to avoid the obstacle from an operator of the aircraft, the aircraft from a manual flight mode to an autonomy flight mode to navigate the aircraft to the location to avoid the obstacle.

DETAILED DESCRIPTION

Figure 1:
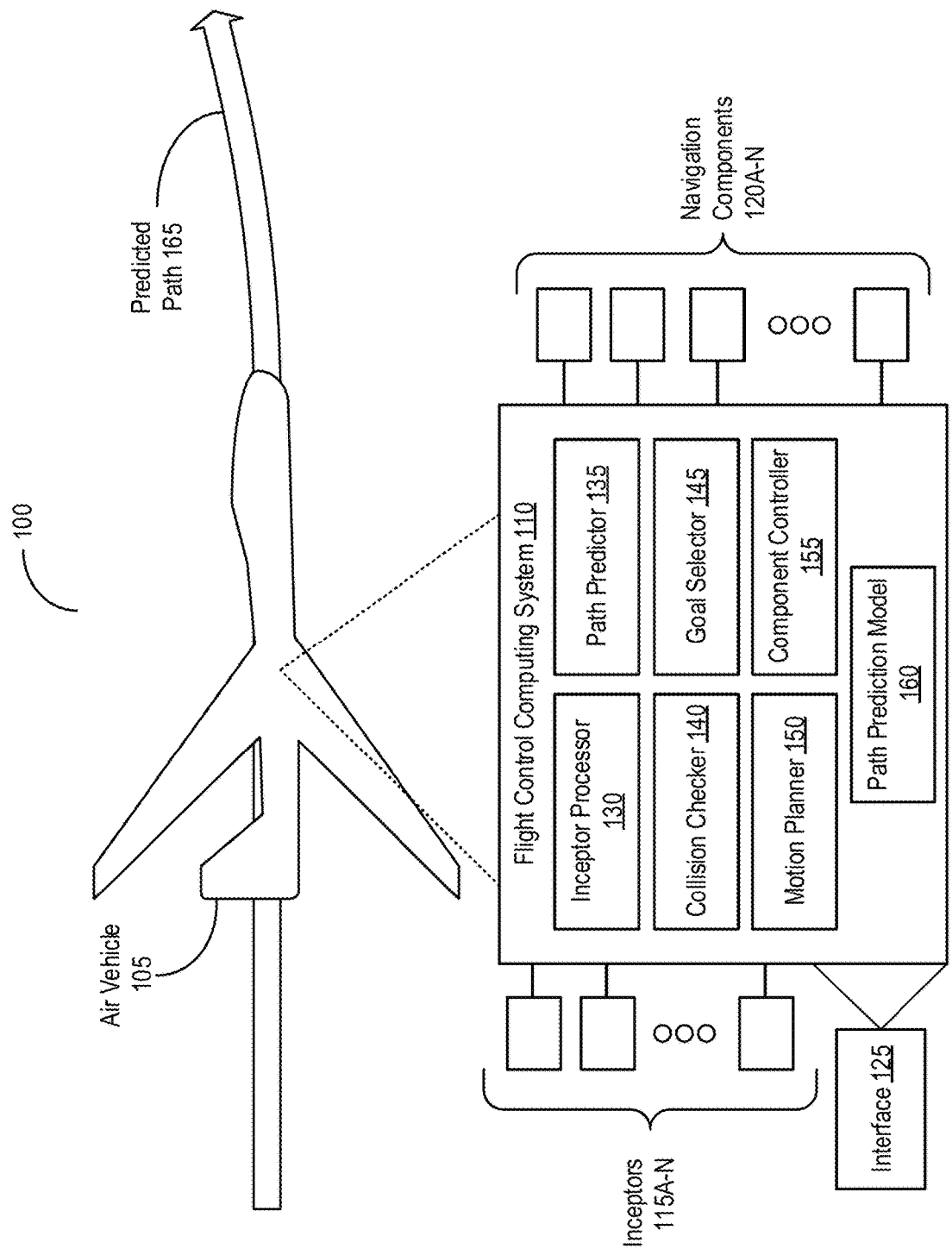
FIG. 1 illustrates a block diagram of a system for controlling navigation of vehicles, in accordance with an illustrative embodiment.

In the following detailed description, reference is made to the accompanying drawings, which form a part hereof. In the drawings, similar symbols typically identify similar components, unless context indicates otherwise.

Referring to FIG. 1, among others, depicted is a block diagram of an environment or a system 100 for controlling navigation of vehicles. In overview, the system 100 may include at least one air vehicle 105. The air vehicle 105 may include at least one flight control computing system 110 (sometimes herein generally referred to as a computing system), one or more inceptors 115A-N (hereinafter generally referred to as inceptors 115), one or more navigation components 120A-N (hereinafter generally referred to as navigation components 120), and at least one interface 125, among others. The flight control computing system 110 may include at least one inceptor processor 130, at least one path predictor 135, at least one collision checker 140, at least one goal selector 145, at least one motion planner 150, at least one component controller 155, at least one path prediction model 160, among others. Various components and modules of the system 100, such as the flight control computing system 110, among others, may be implemented using hardware components or a combination of software and hardware components as detailed herein in FIG. 10.

In further detail, the air vehicle 105 can include any transport capable of navigating through an environment. The air vehicle 105 can be any type of aircraft, such as a fixed-wing aircraft (e.g., with a propeller or jet engine), a rotorcraft (e.g., a helicopter, an autogyro, or a gyrodrone), an aerostat (e.g., an airship or dirigible), or an underwater vehicle (e.g., a submarine, a submersible, or an underwater glider), among others. The air vehicle 105 can be manned or unmanned, or any combination thereof. If manned, the navigation of the air vehicle 105 can be controlled by an onboard pilot from the cockpit therein. If unmanned, the navigation of the air vehicle 105 can be autonomous with no input or remote input (e.g., from a remote terminal) while traveling through the environment. While discussed primarily in terms of an air vehicle, land-bound vehicles (e.g., a sedan car, a truck, a van, or a bus) and seaborne vehicles (e.g., a ship, a frigate, a hydrofoil ship, submarine, or submersible) may be also applicable.

The flight control computing system 110 may be used to determine or generate at least one predicted path 165 via which the air vehicle 105 is to navigate through the environment. In some embodiments, the flight control computing system 110 may be housed, disposed, or otherwise situated in the air vehicle 105. The one or more of the components of the flight control computing system 110 (e.g., the inceptor processor 130, the path predictor 135, the collision checker 140, the goal selector 145, the motion planner 150, the component controller 155, and the path prediction model 160) may be executable on one or more processors coupled with memory of a computing system. The processors may be housed, disposed, or otherwise situated throughout the air vehicle 105. Details regarding the generation of the predicted path 165 will be discussed herein below.

The inceptors 115 may retrieve or receive input from an operator for the flight control computing system 110 to steer, maneuver, or otherwise control the navigation of the air vehicle 105. In some embodiments, the operator (e.g., a pilot) using the inceptors 115 may be physically within the air vehicle 105. In some embodiments, the operator may be remote from the air vehicle 105 to control navigation via the inceptors 115. For example, the inceptors 115 may be communicatively coupled with a remote computing system used by the operator to maneuver the air vehicle 105. The input received by the inceptors 115 may be in any modality, such as tactile input (e.g., acquired via a joystick, pedal, buttons, keyboard, or mouse), voice command (e.g., acquired via a microphone), or visual gesture (e.g., acquired via a camera), among others. The input may define, specify, or identify a velocity (e.g., longitudinal, lateral, and vertical velocities), acceleration (e.g., longitudinal, lateral, and vertical accelerations), and orientation (e.g., roll, pitch, and yaw rates) for the navigation of the air vehicle 105.

The navigation components 120 may be used by the air vehicle 105 to navigate through the environment. The navigation components 120 may be electromechanical parts configured to be set or adjusted to navigate the air vehicle 105 in the environment according to the flight trajectory. The navigation components 120 may be controlled by the flight control computing system 110 in response to an input at one or more of the inceptors 115. The navigation components 120 may, for example, include those for propulsion to navigate through the environment, such as a landing gear, fuel tank, batteries, engine, rotor (including main rotor and tail rotor), wing (including slat, flat, spoiler, and aileron), and tail (including stabilizers, elevator, and rudder), among others.

The air vehicle 105 may also have other components to facilitate the navigation of the air vehicle 105. The air vehicle 105 may have one or more sensors to instrument, measure, or acquire various sensory data associated with the functions of the air vehicle 105, such as the navigation components 120. For example, the sensors may acquire a status, orientation, or position of the rotors, wings (including slat, flat, spoiler, and aileron), and tail (including stabilizers, elevator, and rudder), among others. The sensors may also acquire other metrics associated with the navigation of the air vehicle 105 itself, such as fuel level, speed, acceleration, engine thrust, temperature, wind speed (e.g., headwind, crosswind, and tailwind), among others. The sensors may also acquire position data, such as a location (e.g., a global position system (GPS) coordinates) and altitude, among others, of the air vehicle 105. The sensors may also include various devices to acquire data on the environment surrounding the air vehicle 105, such as a LiDAR, RADAR, or camera, among others.

Figure 2:
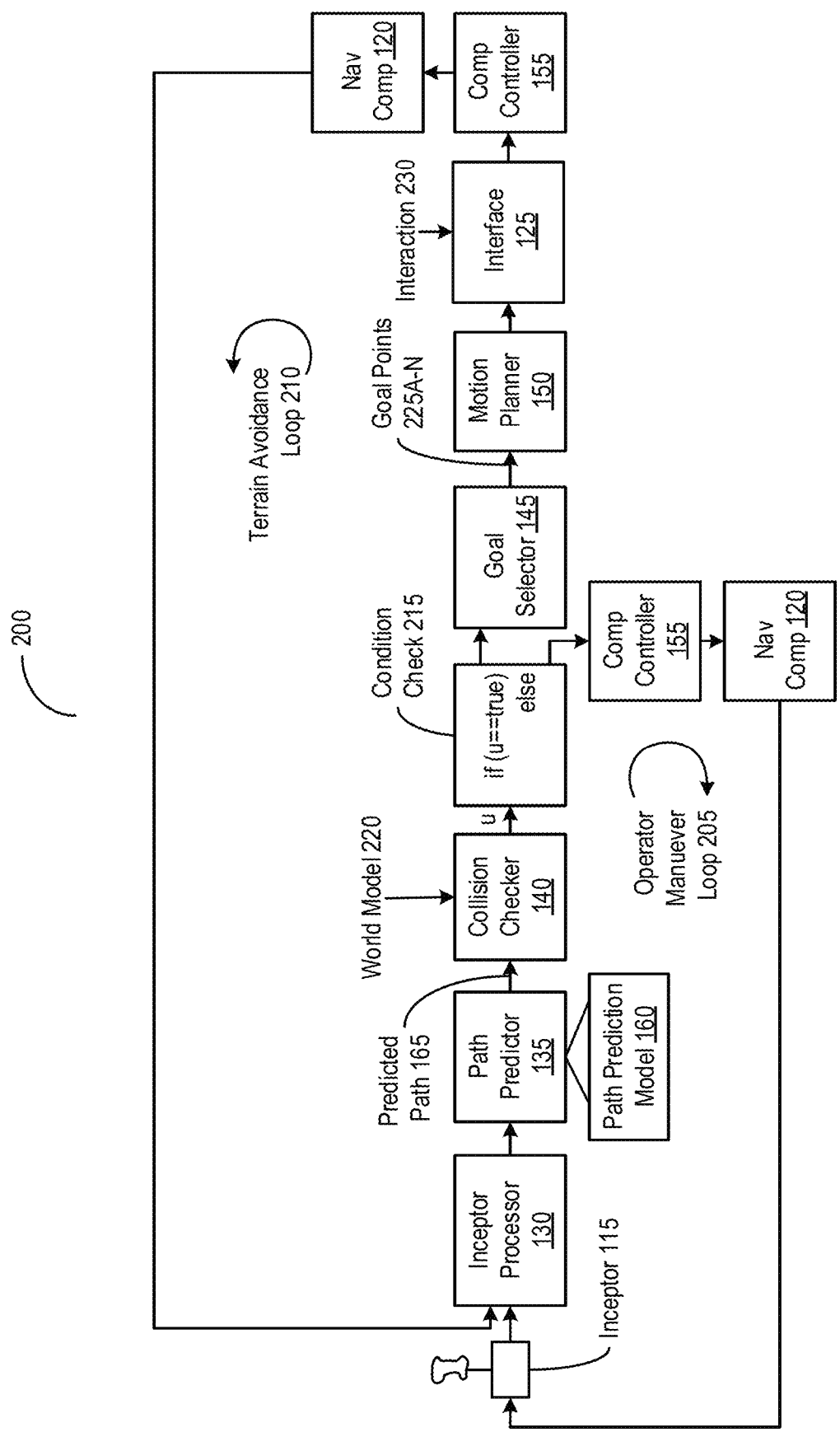
FIG. 2 illustrates a block diagram of an architecture for a system for controlling navigation of vehicles, in accordance with an illustrative embodiment.

Referring to FIG. 2, among others, depicted a block diagram of an architecture 200 for the system 100 for controlling navigation of vehicles. The architecture 200 may specify a flow of data among the components of the system 100, including the flight control computing system 110 in the air vehicle 105. The architecture 200 may include at least one operator maneuver loop 205 and at least one terrain avoidance 210 (e.g., as depicted). The operator maneuver loop 205 and the terrain avoidance loop 210 may form two respective branches of data flow in the architecture 200. The division into the two branches may be dependent on a condition check 215. In general, the operator maneuver loop 205 may correspond to operations in the flight control computing system 110 to navigate the air vehicle 105 using inputs by the operator via the inceptors 115 (e.g., in accordance with model following control laws). The terrain avoidance loop 210 may corresponds to operations in the flight control computing system 110 to perform terrain avoidance measures upon detection of an obstacle in the terrain of the environment.

The inceptor processor 130 may retrieve, identify, or otherwise receive a set of command signals from at least one of the inceptors 115 to control navigation of the vehicle 105 through the environment. In some embodiments, the inceptor processor 130 may monitor for the set of command signals from the one or more inceptors 115. The set of command signals may be generated or derived from at least one input acquired via one or more of the inceptors 115. The set of command signals may be generated by the inceptors 115 by converting the input received from an operator of the air vehicle 105. Upon generation, the inceptors 115 may convey or send the set of commands to the flight control computing system 110, and the inceptor processor 130 in turn may detect the set of command signals. The set of command signals may be to set or adjust the velocity (e.g., longitudinal, lateral, and vertical velocities), the acceleration (e.g., longitudinal, lateral, and vertical accelerations), and the orientation (e.g., roll, pitch, and yaw rates) for navigation of the air vehicle 105. The set of commands may include a set of corresponding values to apply to set, configure, or modify the functioning of the navigation components 120.

With the identification, the inceptor processor 130 may measure, determine, or otherwise identify a time point at which the set of commands are identified from the input. The time point may define or correspond to a point in time at which the set of commands are generated by the inceptor 115 or received at the flight control computing system 110. In some embodiments, the inceptor processor 130 may parse the set of commands to extract or identify the time point (e.g., in the form of a timestamp) at which the set of commands were generated by the inceptor 115. In some embodiments, the inceptor processor 130 (or the flight control computing system 110) may maintain a timer to keep track of time. Using the timer, the inceptor processor 130 may identify the time point at which the set of commands are received from the inceptors 115. In some embodiments, the inceptor processor 130 may store and maintain the time point on a storage of the flight control computing system 110.

In some embodiments, the inceptor processor 130 may apply one or more filters to the set of command signals derived from the input acquired via the inceptors 115. The filters may be part of pre-processing step applied to the set of commands prior to feeding forward to the remaining components of the flight control computing system 110 in accordance with the architecture 200. In some embodiments, the inceptor processor 130 may use the filters to shape the overall set of command signals identified from the inceptors 115. For example, the inceptor processor 130 may use notch filtering to minimize interaction or interference between the rotorcraft modes, and the cyclic and yaw control commands from the inceptors 115. The inceptor processor 130 may also apply rate limiting to the collective set of command signals to suppress any values out-of-bounds from the expected rates. In applying, the inceptor processor 130 may feed and process the set of command signals through the filters to produce a filtered set of command signals. The inceptor processor 130 may convey, feed forward, or otherwise provide the set of commands signals to the path predictor 135.

With receipt, the path predictor 135 may apply, feed, or otherwise input the set of command signals to the path prediction model 160 to generate one or more predicted paths 165. In some embodiments, the path predictor 135 may input the set of command signals at a time interval to the path prediction model 160. The time interval may specify or define an amount of time between each successive input of the set of command signals into the path prediction model 160. The time interval may be defined in terms of cycles per second (or Hz), and may range between 50 to 150 Hz.

In some embodiments, the path predictor 135 may retrieve, receive, or otherwise identify sensory data from the sensors on the air vehicle 105 to input into the path prediction model 160. As discussed above, the sensory data may include, for example, a status, orientation, or position of the navigation components 120. The sensory data may also include metrics associated with the navigation of the air vehicle 105 and the location data of the air vehicle 105. With the identification, the path predictor 135 may apply, feed, or otherwise input the sensory data into the path prediction model 160. The inputting may also be at the time interval.

The path prediction model 160 may include one or more functions for processing one or more of the command signals received from the inceptors 115. In general, each function of the path prediction model 160 may have at least one input, one or more operands, and at least one output. Each input and output may correspond to at least one of the command signals. In some embodiments, the input or output may also correspond to at least one of the measurements in the sensory data. The inputs and the outputs for a given function may be related to one another via the operands. The operands may specify or define one or more operations (e.g., addition, subtraction, multiplication, division, integration, or Boolean operators) to be performed on the inputs to produce the outputs. For example, the path prediction model 160 may have one function for processing command signals related to acceleration and another function for processing command signals related to velocity. The details of the architecture for the path prediction model 160 are discussed herein below in conjunction with FIGS. 3A-4.

From inputting, the path predictor 135 may process the set of command signals (and the sensory data) in accordance with the functions of the path prediction model 160 to produce, output, or otherwise generate the one or more predicted paths 165 over a time window. Each predicted path 165 may specify, define, or otherwise identify a route via which the air vehicle 105 is to navigate from a current point to an end point over the time window, given the set of command signals. The time window (sometimes referred herein as a prediction horizon or time horizon) for the predicted path 165 may be a relative to the time point at which the set of command signals was generated on the inceptors 115 or received at the flight control computing system 110. The time window may range from 5 seconds to 45 seconds out from the time point at which the set of command signals is identified. The predicted path 165 may have a distance corresponding the time window and a current velocity of the air vehicle 105.

The current point may correspond to or identify a present location of the air vehicle 105 in the environment. The end point may correspond to or identify a predicted location of the air vehicle 105 upon traversing the environment by the time window based on the set of command signals. In some embodiments, the route for the predicted path 165 may also include one or more consecutive waypoints from the current point to the end point over the time window. Each of the current point, the waypoints, and the end point may be defined in terms of geographic coordinates (e.g., GPS coordinates) and an altitude relative to the environment in which the air vehicle 105 is navigating. The altitude may identify the vertical distance between the air vehicle 105 and sea level of the environment. At each point, the predicted path 165 may also define or identify a predicted velocity, a predicted angle (e.g., orientation), or a range of predicted velocities or ranges, among parameters, along a pitch axis, a roll axis, or a yaw axis relative to the air vehicle 105.

Figure 3A:
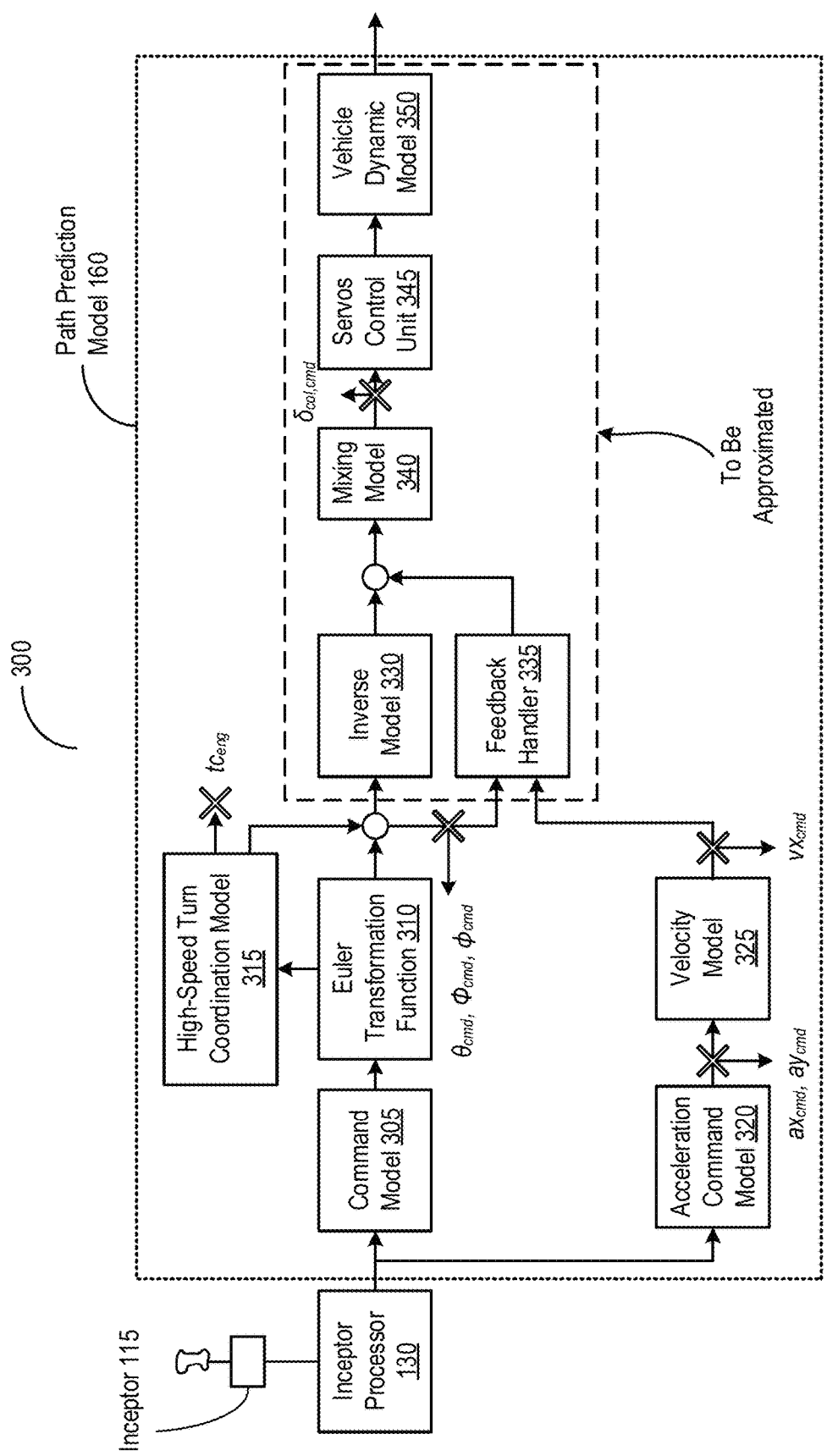
FIG. 3A illustrates a block diagram of a full-order architecture for a trajectory prediction model in the system for controlling navigation, in accordance with an illustrative embodiment.

Referring to FIG. 3A, among others, depicted is a block diagram of a full-order architecture 300 for the path prediction model 160 in the system for controlling navigation. Under the full-order architecture 300, the path prediction model 160 may include at least one command model 305, at least one Euler transformation function 310, at least one high-speed turn coordination model 315, at least one acceleration model 320, at least one velocity model 325, at least one inverse model 330, at least one feedback handler 335, at least one mixing model 340, at least one servos control unit 345, and at least one vehicle dynamic model 350, among others. The path predictor 135 may process the set of command signals generated by the inceptor 115 in accordance with the components and interconnections of the path prediction model 160 to generate the predicted path 165. The set of commands at various points within the path prediction model 160 may, for example, be denoted with the following symbols:

$\dot{\phi}_{cmd}$ = Commanded Roll Rate
$\dot{\theta}_{cmd}$ = Commanded Pitch Rate
$\dot{\psi}_{cmd}$ = Commanded Yaw Rate
$\alpha x_{cmd}$ = Commanded Longitudinal Acceleration
$\alpha y_{cmd}$ = Commanded Lateral Acceleration
$\alpha z_{cmd}$ = Commanded Vertical Acceleration
$v x_{cmd}$ = Commanded Longitudinal Velocity
$tc_{eng}$ = Turn Coordination On/Off
$\delta_{col,cmd}$ = Change in Commanded Collective The command model 305 may calculate or generate rate command signals and angular acceleration command signals based on longitudinal cyclic, lateral cyclic, and pedal positions inputted via the inceptors 115. The command model 305 may also dynamically shape the set of command signals, and may limit the acceleration command signals to reduce structural loads generated by command inputs. The input of the command model 305 may be from the inceptor processor 130. The output of the command model 305 may be fed to the Euler transformation function 310.

The Euler transformation function 310 may include a thetadot and psidot functions to allow the operator of the air vehicle 105 to command Euler rates when the air vehicle 105 is near wings level. The calculation of Euler rates may minimize undesirable inter-axis coupling of control inputs when the single axis responses are desirable. The thetadot function may command pitch attitude rate changes with longitudinal cyclic inputs in hover or lower-speed operations within small bank angles. The psidot function may command heading rate changes with pedal inputs within small pitch attitudes and bank angles at all speeds. The output of the Euler transformation function 310 may be fed to the high-speed turn coordination model 315, the inverse model 330, and the feedback handler 335.

The high-speed turn coordination model 315 may minimize lateral acceleration and may maintain roll and pitch attitudes by commanding rates while in a banked turn at high speeds. The input of the high-speed turn coordination model 315 may be the output of the Euler transformation function 310. The output of the high-speed turn coordination model 315 may be fed to the inverse model 330 and the feedback handler 335.

The acceleration command model 320 may generate longitudinal and lateral acceleration command signals with cyclic inputs. The inputs for the acceleration command model 320 may be taken from the inceptor processor 130. The outputs from the acceleration command model 320 may be passed to the velocity model 325. The velocity model 325 may accept the acceleration command signals from the acceleration command model 320, and may integrate the acceleration command signals to calculate the velocity command signals. The velocity model 325 may also calculate and provide velocity error as output to the feedback handler 335 to maintain the velocity of the air vehicle 105.

The inverse model 330 (also referred herein sometimes as an inverse plant function) may accept the total command signals for pitch, roll, and yaw rates as inputs. The inverse model 330 may shape the command signals for the rate by a simplified inverse model for each axis of the dynamics of the air vehicle 105. The inverse model 330 may calculate command signals for pitch, roll, and yaw rates to feed forward to generate responses approximating the command signals for the rates. The parameters for the inverse model 330 may be scheduled with airspeed to match the plant dynamics. The outputs of the inverse model 330 may be fed forward to the mixing model 340.

The feedback handler 335 may compare the commanded altitude, rate, and acceleration signals in pitch, roll, and yaw axes with the sensed data. The error signals may be converted to control commands. The outputs of the feedback handler 335 may be conveyed to the mixing model 340. The mixing model 340 (also referred herein sometimes as control mixing) may minimize off-axis cross-coupling. The mixing model 340 may combine the control command signals so that the responses remain on axis relative to the air vehicle 105. The output of the mixing model 340 may be fed forward to the servos control unit 345.

The servos control unit 345 may convert the control command signals calculated by other components in the path prediction model 160 to actuation signals to direct navigation components 120. The servos control unit 345 may also use feedback from the navigation components 120 to set, update, or otherwise adjust the actuation signals to provide back to the navigation components 120. In addition, the vehicle dynamic model 350 may keep track of various state variables characterizing the air vehicle 105, such as rotor flapping angles, main rotor inflow, and tail rotor inflow, among others. The vehicle dynamic model 350 may adjust the control command signals based on a response of the navigation components 120 and other components of the air vehicle 105. The vehicle dynamic model 350 may suppress or cancel measured aircraft dynamics (e.g., acquired via sensors onboard) with an inverse of the aircraft dynamics.

Under the full-order architecture 300, the various components of the path prediction model 160 may be in total, linear order, including the initially configured inputs, outputs, and operands. At least some of the components in the path prediction model 160, such as the inverse model 330, the feedback handler 335, the mixing model 340, the servos control unit 345, and the vehicle dynamic model 350, among others may be approximated using a reduced order representation. The reduced order representation may lower the computational complexity of the functions specified by the components of the path prediction model 160. Relative to the reduced order representation (e.g., discussed below), the full-order architecture 300 may rely on at least an order of magnitude more in the number of inputs to populate and generate the predicted paths 165.

Figure 3B:
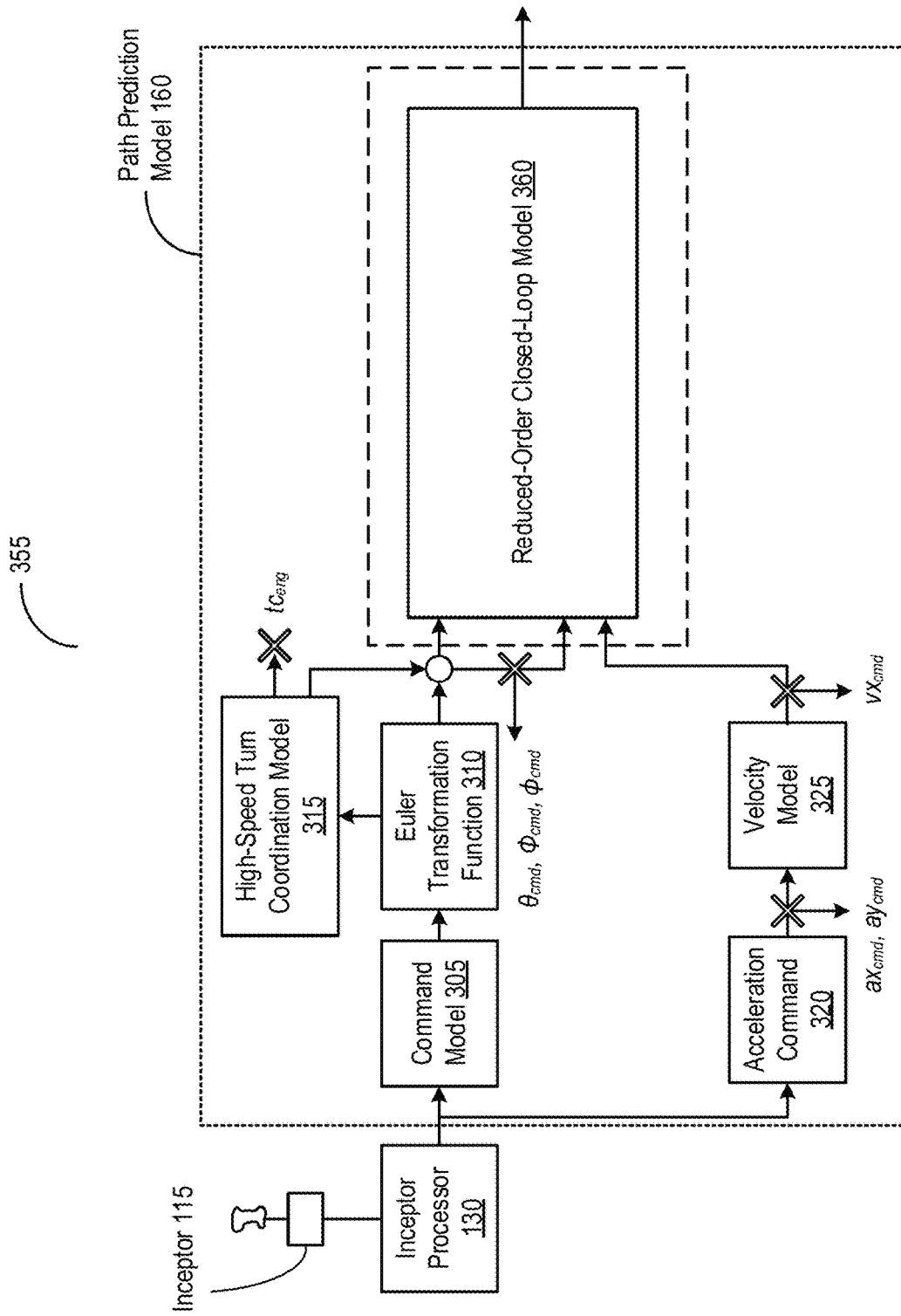
FIG. 3B illustrates a block diagram of a reduced-order architecture for a trajectory prediction model in the system for controlling navigation, in accordance with an illustrative embodiment.

Referring to FIG. 3B, among others, depicted is a block diagram of a reduced-order architecture 355 for the path prediction model 160 in the system for controlling navigation. The path prediction model 160 under the reduced-order architecture 355 may include the components of the path prediction model 160 under the full-order architecture 300. The difference from the full-order architecture 300 may be that in the reduced-order architecture 355, at least some of the components may be approximated using order reduction. The path prediction model 160 may have at least one reduced-order closed-loop model 360. The reduced-order closed-loop model 360 may approximate the behavior of at least some of the components of the path prediction model 160 under the full-order architecture 300. The reduced-order closed-loop model 360 may substitute or replace the components of the path prediction model 160 whose behavior are approximate. For example, as depicted, the reduced-order closed-loop model 360 may approximate the behavior of the inverse model 330, the feedback handler 335, the mixing model 340, the servos control unit 345, and the vehicle dynamic model 350 and may substitute these components in the reduced-order architecture 355.

The reduced-order closed-loop model 360 may have the inputs and outputs of the replaced components. For example, the reduced-order closed-loop model 360 may have the inputs and outputs of the inverse model 330, the feedback handler 335, the mixing model 340, and the servos control unit 345. The internal operands of the reduced-order closed-loop model 360 may be defined or configured using model order reduction (MOR) of the components of the path prediction model 160 to be approximate. The MOR techniques may include, for example, decomposition (e.g., proper orthogonal decomposition and proper generalized decomposition), reduced basis, balancing, operational based reduction, non-linear manifold, interpolation (e.g., matrix interpolation, transfer function interpolation, and piecewise interpolation), among others. In some embodiments, the reduced-order closed-loop model 360 may approximate the closed-loop dynamics by a set of command filters that have the same time-domain and frequency-domain characteristic (e.g. bandwidth and slew-rate and settling time) as the full order architecture 300. With the reduced-order closed-loop model 360, the computation complexity of the path prediction model 160 of the reduced-order architecture 355 may be less than the computational complexity of the path prediction model 160 of the full-order architecture 300. In addition, the reduced-order architecture 355 may perform shaping and integration on acceleration and rate command signals to project or predicted position, velocity, and altitude signals to generate the predicted path 165.

The path predictor 135 may process the set of command signals generated by the inceptor 115 in accordance with the components and interconnections of the path prediction model 160 including the reduced-order closed-loop model 360. By processing with the reduced-order architecture 355 for the path prediction model 160, the path predictor 135 may generate the predicted path 165. The determination of the predicted path 165 using the reduced-order architecture 355 may be quicker relative to using the full-order architecture 300, due to the lower computational complexity.

Figure 4:
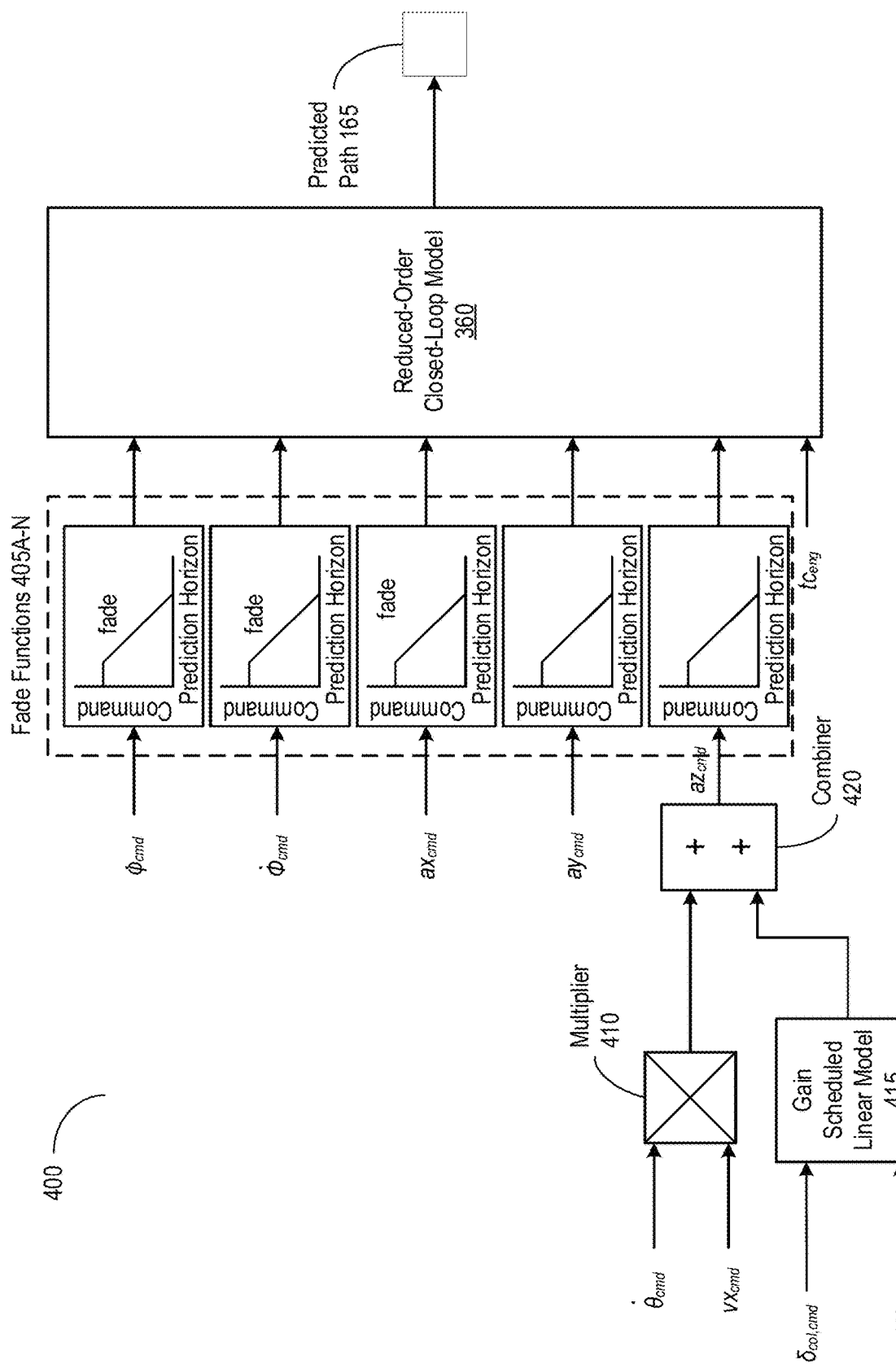
FIG. 4 illustrates a block diagram of an architecture for inputs to a reduced-order closed-loop model in the system for controlling navigation, in accordance with an illustrative embodiment.

Referring to FIG. 4, among others, depicted is a block diagram of an architecture 400 of inputs for the reduced-order closed-loop model 360 in the system 100 for controlling navigation. Under the architecture 400, the path prediction model 160 may have one or more fade functions 405A-N (hereinafter generally referred to as fade functions 405), at least one multiplier 410, at least one gain scheduled linear model 415, and at least one combiner 420, among others. Each of the fade functions 405, the multiplier 410, the gain scheduled linear model 415, and the combiner 420 may have outputs that are directly or indirectly fed as inputs into the reduced-order closed loop model 355 to generate the predicted path 165.

The fade function 405 may reduce, lower, or otherwise attenuate the set of command signals to be inputted into the reduced-order closed-loop model 360 over the time window relative to the time point at which the set of command signals was generated at the inceptors 115. In general, the attenuation defined by the fade function 405 may maintain the values for the set of command signals closer to the time point at which the command signals were received. The attention defined by the fade function 405 may gradually lower the values for the set of command signals further away from the time point, and may completely suppress or make null the value of the set of command signals beyond the time window. For example, as depicted, the fade function 405 may linearly taper values of the command signals received further away in the future relative to the time point until null at the end of the time window (labeled as "prediction horizon"). In some embodiments, the definition for the fade function 405 may differ depending on the type of command signal inputted. The output of the fade functions 405 may be fed as inputs to the reduced-order closed-loop model 360.

The multiplier 410 may calculate, determine, or generate a product of two or more of the command signals. In some embodiments, the multiplier 410 may apply coefficients to the input command signals. The coefficients may differ among the types of command signals. The multiplier 410 may perform a time-series multiplication of the values of the inputted command signals. The output resultant generated by the multiplier 410 may include a product of the values at each time sample from the two or more command signals. The input to the multiplier 410 may include at least a subset of the command signals. The output of the multiplier 410 may be fed into the reduced-order closed-loop model 360 via one or more other components in the architecture 400, such as at least one of the fade functions 405 and the combiner 420 as depicted.

The gain scheduled linear model 415 may calculate, determine, or otherwise generate at least one resultant based on at least a subset of the command signals. The resultant may define, identify, or include a simulated command signal corresponding to the input command signals. For example, as depicted, the gain scheduled linear model 415 may have a change in collective command signal ($\delta_{col,cmd}$) and a longitudinal velocity command signal ($vx_{cmd}$) as inputs. Using the inputs, the gain scheduled linear model 415 may generate a simulated vertical acceleration for the command signal to provide as output. The output of the gain scheduled linear model 415 may be fed forward to the reduced-order closed-loop model 360, via one or more other components of the input architecture 400, such as at least one of the fade functions 405 and the combiner 420 as depicted.

The combiner 420 may calculate, determine, or generate a sum of the two or more inputs, such as outputs of other components in the architecture 400 (e.g., the multiplier 410 and the gain scheduled linear model 415 as depicted). In some embodiments, the combiner 420 may generated a weighted sum of the inputs. The weight may differ among the inputs. The output resultant generated by the combiner 420 may include a sum of the values at each time sample from the two or more command signals. The output of the combiner 420 may be fed into the reduced-order closed-loop model 360 via one or more other components in the architecture 400, such as at least one of the fade functions 405 as depicted.

In feeding the inputs through the path prediction model 160, the path predictor 135 may apply the components of the input architecture 400 to at least a subset of the command signals. For example, as depicted, the path predictor 135 may attenuate a roll rate command signal ($\varphi_{cmd}$), a yaw rate command signal ($\psi_{cmd}$), a longitudinal acceleration command signal ($ax_{cmd}$), a lateral acceleration command signal ($ay_{cmd}$), and a vertical acceleration command signal ($az_{cmd}$) using the corresponding fade functions 405. The output of each fade function 405 may include the corresponding command signal with the application of the attenuation over the time window. The path predictor 135 may feed forward the outputs from the fade functions 405 to the reduced-order closed-loop model 360.

In conjunction, the path predictor 135 may apply the pitch rate command signal ($\theta_{cmd}$) and the longitudinal velocity command signal ($vx_{cmd}$) to the multiplier 410 to output a resultant product. The path predictor 135 may feed forward the resultant to the combiner 420. Additionally, the path predictor 135 may input a commanded collective command signal ($\delta_{col,cmd}$) and the longitudinal velocity command signal ($vx_{cmd}$) to the gain scheduled linear model 415 to calculate the simulated vertical acceleration for the command signal. The path predictor 135 may feed the output from the gain scheduled linear model 415 into the combiner 420.

The path predictor 135 in turn may use the combiner 420 to process the outputs from the multiplier 410 and the gain scheduled linear model 415 to generate a resultant output. The path predictor 135 may feed the output from the combiner 420 to a corresponding fade function 405. Concurrently, the path predictor 135 may feed the command signal specifying whether the turn coordination mode is enabled or disabled ($tc_{eng}$) directly into the reduced-order closed-loop model 360. By applying the command signals to the path prediction model 160 in this manner, the path predictor 135 may generate the predicted path 165 for the navigation of the air vehicle 105.

Under the reduced-order architecture 355, various outputs can be computed thousands of time per control cycle with various input parameters (e.g., wind magnitude direction). Furthermore, the reduced-order architecture 355 may apply command model parameters at various fade rates for the inputs to obtain a set of trajectories satisfying the constraints given the current state of the air vehicle 105 and the input from the inceptor 115. In contrast with the full order model 300, the computational complexity may be lower. For example, the full order model 300 may rely on a complete vehicle dynamics (e.g., as simulated using the vehicle dynamic model 350) to make various calculations, and may entail initialization in each prediction cycle. But certain state variables (e.g., rotor inflow and flapping angles for a helicopter) may not be measure and initialized at each instance. Due to the computation complexity, it may be difficult to use the full order model 300 for path prediction. The reduced-order architecture 355, on the other hand, may be unencumbered by such reliance on complete vehicle dynamics, and may be used to generate the set of trajectories within constraints. In addition, the reduced-order closed-loop model 360 can be augmented with a covariance propagation model to determine the variance of the predicted trajectory over time. For example, closer to the air vehicle 105, the variance of the predicted path may become small and the further in time, the covariance may become higher to account for uncertainty.

Referring back to FIG. 2, the collision checker 140 may identify or determine whether at least one of the predicted paths 165 intersects with at least one obstacle in the environment within the time window. The performance of the determination may correspond to the condition check 215 within the architecture 200 for the flight control computing system 110. In determining, the collision checker 140 may access or use a world model 220. The world model 220 may define a terrain of the environment through which the air vehicle 105 is navigating, in terms of geographic coordinates (e.g., GPS coordinate). At each geographic coordinate, the world model 220 may identify various characteristics regarding the terrain, such as elevation (e.g., measured in metric or feet relative to sea level), terrain type (e.g., mountain, plain, river, lake, and sea), and an indication of occupation (e.g., presence of city, building, or other human settlement), among others. In some embodiments, the world model 220 may be stored and maintained on the storage of the flight control computing system 110, using one or more data structures (e.g., array, matrix, table, linked list, table, and heap). In some embodiments, the world model 220 may be provided by a remote computing system to the flight control computing system 110 during the navigation. In some embodiments, the world model 220 may be generated by the flight control computing system 110 using the data about the environment from the sensors (e.g., LiDAR, RADAR, and camera).

In addition, the collision checker 140 may determine or identify the location of the air vehicle 105 in the environment from the world model 220. The location of the air vehicle 105 may be defined in terms of geographic coordinates. In some embodiments, the collision checker 140 may invoke or use a GPS module in the flight control computing system 110 to identify the location of the air vehicle 105 (e.g., the GPS coordinates). The collision checker 140 may also determine or identify the altitude at which the air vehicle 105 is navigating from the sensors on the air vehicle 105. At least one of the sensors may measure and provide the altitude of the air vehicle 105 within the environment. The altitude may, for example, identify a vertical distance between the air vehicle 105 and sea level.

Using the location of the air vehicle 105, the collision checker 140 may extract, select, or otherwise identify at least a portion of the environment from the world model 220. The portion may correspond to the environment from the world model 220 around the location of the air vehicle 105 by at least some distance (e.g., more than the distance of the predicted path 165). The portion may be of any shape, such a rectangle, square, a pentagon, a hexagon, an ellipsis, or a circle, among others. The portion of the terrain of the environment may be used to check whether the predicted path 165 intersects with any obstacle in the terrain. In some embodiments, the collision checker 140 may otherwise identify the portion of the environment from the world model 220 at the altitude of the air vehicle 105. The identified portion of the environment may correspond to the terrain having elevation matching the altitude of the vehicle 105.

To determine, the collision checker 140 may check or compare the predicted path 165 for the navigation of the air vehicle 105 with the world model 220. In comparing, the collision checker 140 may identify the points of the predicted path 165. The points of the predicted path 165 may include the initial point, waypoints, and terminal point for navigating the air vehicle 105, and may be defined in terms of geographic coordinates and altitude. For each point of the predicted path 165, the collision checker 140 may determine or identify the elevation of the terrain at the point from the world model 220. For example, for the geographic coordinates of a given point in the predicted path 165, the collision checker 140 may identify the elevation of the terrain at the same geographic coordinates using the world model 220. In some embodiments, the collision checker 140 may compare against the elevation of the terrain from the portion previously identified from the world model 220.

With the identifications for each point of the predicted path 165, the collision checker 140 may determine whether the altitude at the point of the predicted path 165 for the air vehicle 105 is less than or equal to the elevation of the terrain at the point. Any part of the terrain having an elevation that is more than or equal to the altitude of the air vehicle 105 at the corresponding point on the predicted path 165 may correspond an obstacle in the environment. When the altitude is greater than the elevation of the terrain over all the points of the predicted path 165, the collision checker 140 may determine that the predicted path 165 does not intersect with any obstacles in the environment during the time window. The collision checker 140 may also identify the environment as free of obstacles to the air vehicle 105 along the predicted path 165. The collision checker 140 may also pass, convey, or otherwise provide the set of command signals from the path predictor 135 to the component controller 155 to continue with the operator maneuver loop 205.

When the altitude is less than or equal to the elevation of the terrain for at least one points, the collision checker 140 may determine that the predicted path 165 intersects with the obstacle in the environment during the time window for the predicted path 165. The collision checker 140 may also identify the point of the predicted path 165 that has the altitude less than or equal to the elevation of the terrain. The collision checker 140 may identify the corresponding part of the terrain as the obstacle in the environment that intersects with the predicted path 165. In addition, the collision checker 140 may also refrain from providing the set of command signals from the path predictor 135 to the component controller 155. The collision checker 140 invoke the goal selector 145 to transition to the terrain avoidance loop 210.

In some embodiments, the collision checker 140 may determine whether the altitude at the point is less than or equal to the elevation of the terrain by a clearance margin. The clearance margin may, for example, range between 0 to 100 ft, between the air vehicle 105 and the terrain. When the altitude is greater than the elevation of the terrain over all the points of the predicted path 165 by at least the clearance margin, the collision checker 140 may determine that the predicted path 165 does not intersect with any obstacles in the environment during the time window. The collision checker 140 may also identify the environment as free of obstacles to the air vehicle 105 along the predicted path 165. In addition, the collision checker 140 may also pass, convey, or otherwise provide the set of command signals from the path predictor 135 to the component controller 155 to continue with the operator maneuver loop 205. In some embodiments, if the predicted path is determined to be free, the commands from the inceptor 115 may be fed by the inceptor processor 130 to the component controller 155, without any input from the path predictor 135 or the collision checker 140. The flight control computing system 110 may remain in the original manual flight mode.

On the contrary, when the altitude is less than or equal to the elevation of the terrain within the clearance margin for at least one points, the collision checker 140 may determine that the predicted path 165 intersects with the obstacle in the environment during the time window for the predicted path 165. The collision checker 140 may also identify the point of the predicted path 165 that has the altitude less than or equal to the elevation of the terrain. The collision checker 140 may identify the corresponding part of the terrain as the obstacle in the environment that intersects with the predicted path 165. The collision checker 140 may also refrain from providing the set of command signals from the path predictor 135 to the component controller 155. The collision checker 140 may invoke the goal selector 145 to transition to the terrain avoidance loop 210.

When the predicted path 165 is determined to not intersect, the component controller 155 may perform an action to direct the air vehicle 105 in accordance with the set of command signals. The set of command signals may correspond to command signals inputted via the inceptors 115. The component controller 155 may apply the set of command signals to the corresponding navigation components 120 to navigate the air vehicle 105 along the predicted path 165. In some embodiments, the component controller 155 may identify one or more of the navigation components 120 to which to apply the set of command signals. In applying, the component controller 155 may convert the set of command signals to actuator control signals. For instance, the component controller 155 may generate actuator control signals to control or adjust the elevator, rudder, aileron, and throttle in the navigation components 120 for the air vehicle 105. The generation of the actuator control signals may be performed via a series of feedback control loops and functions by comparing the signal with the measurements regarding the navigation components 120 on the air vehicle 105.

On the other hand, when the predicted path 165 is determined to intersect, the goal selector 145 may identify, determine, or otherwise generate one or more goal points 225A-N (hereinafter generally referred to goal points 225 or locations). The goal points 225 may correspond to locations to which to navigate the air vehicle 105 to avoid the obstacle in the environment. The generation of goal points 225 may factor in the location of the air vehicle 105 within the environment and the obstacle in the terrain as identified from the world model 220. The generation of the goal points 225 may also depend on a mode of operation for the air vehicle 105. The air vehicle 105 may have any number of modes of operation as defined by the speed (or velocity) of the air vehicle 105 while navigating through the environment. In some embodiments, the air vehicle 105 may have two modes of operation defined by a threshold speed. The threshold speed may delineate, identify, or otherwise define a value of the speed at which the air vehicle 105 is operating in one mode or another mode. For example, the air vehicle 105 may have a low-speed mode corresponding to when the speed of the air vehicle 105 lower than or equal to 50 knots and a high-speed mode corresponding to when the speed of the air vehicle 105 is greater than 50 knots.

In generating, the goal selector 145 may identify the mode of operation for the air vehicle 105 based on the speed (or velocity) of the air vehicle 105. The goal selector 145 may identify the speed from the sensors on the air vehicle 105. The goal selector 145 may compare the speed of the air vehicle 105 with the threshold speed for the modes of operation. Based on the comparison, the goal selector 145 may identify the mode of operation with the definition satisfying the identified speed. When the speed of the air vehicle 105 is determined to be greater than or equal to the threshold speed, the goal selector 145 may determine that the air vehicle 105 is operating in the high-speed mode. Conversely, when the speed of the air vehicle 105 is determined to be less than the threshold speed, the goal selector 145 may determine that the air vehicle 105 is operating in the low-speed mode.

If the air vehicle 105 is identified as operating in a high-speed mode, the goal selector 145 may generate a set of goal points 225 for the air vehicle 105 to evade the obstacle in the environment by at least a clearance distance. The clearance distance may correspond to a distance (e.g., vertical or horizontal) between the obstacle and the position of the air vehicle 105, and may differ or be the same in value (e.g., between 0 to 100 ft) as the clearance margin discussed above. The set of goal points 225 may include an initial point, one or more waypoints, and a terminal point for navigating the air vehicle 105 to evade or avoid the obstacle by at least the clearance distance. Each of the goal points 225 may define or specify geographic coordinates (e.g., GPS coordinates), altitude, speed, acceleration, and orientation for the navigation of the air vehicle 105. The set of goal points 225 may be over a time window wider than the time window for the predicted path 165. For example, the time window for the set of goal points 225 may be 3 to 6 times longer than the time window for the predicted path 165. In some embodiments, the goal selector 145 may determine each of the goal points 225 based on the terrain of the environment from the world model 220. Examples of the set of goal points 225 generated when the air vehicle 105 is identified as operating in the high-speed mode are described herein below in conjunction with FIGS. 5A-C.

Figure 5A:
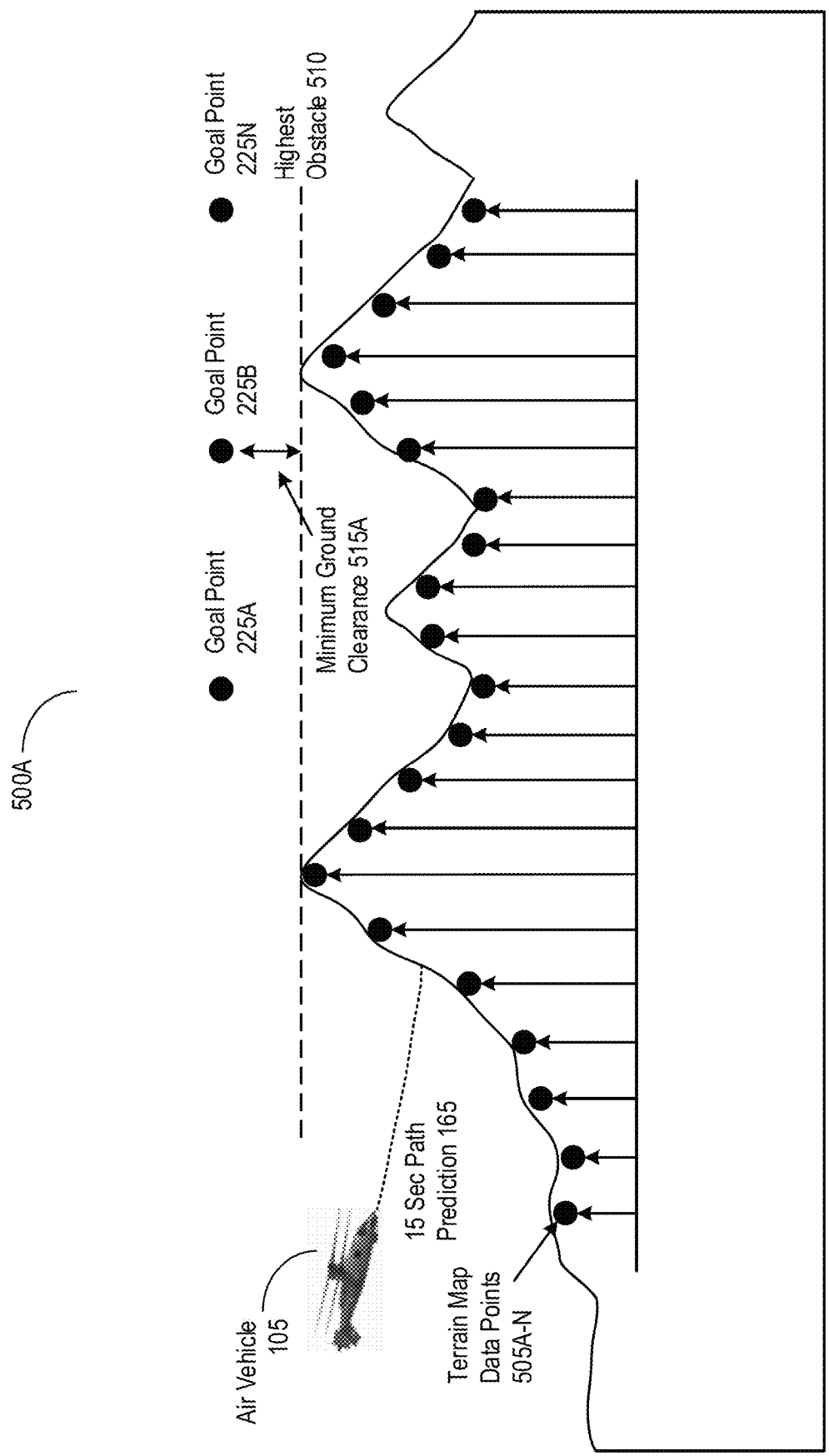
FIGS. 5A-C each illustrate a diagram of an example goal points selection for terrain obstacle avoidance in the system for controlling navigation under high-speed mode, in accordance with an illustrative embodiment.

Referring to FIG. 5A, among others, depicted is an example of goal point generation 500A for terrain obstacle avoidance under high-speed mode. In the depicted example, the path predictor 135 may have generated the predicted path 165 with a 15 second time window. The collision checker 140 may have determined that the predicted path 165 intersects with the terrain using data points 505A-N (hereinafter generally referred to as data points 505) of the terrain map from the world model 220. In turn, the goal selector 145 may generate the set of goal points 225 using an elevation of the highest obstacle 510 and a minimum ground clearance 515A (sometimes herein referred to as the clearance distance). The goal selector 145 may identify the elevation of the highest obstacle 510 from the data points 505 of the terrain map. Each of the goal points 225 may have a position above the elevation of the highest obstacle 510 by at least the minimum ground clearance 515A from the elevation of the highest obstacle 510.

Figure 5B:
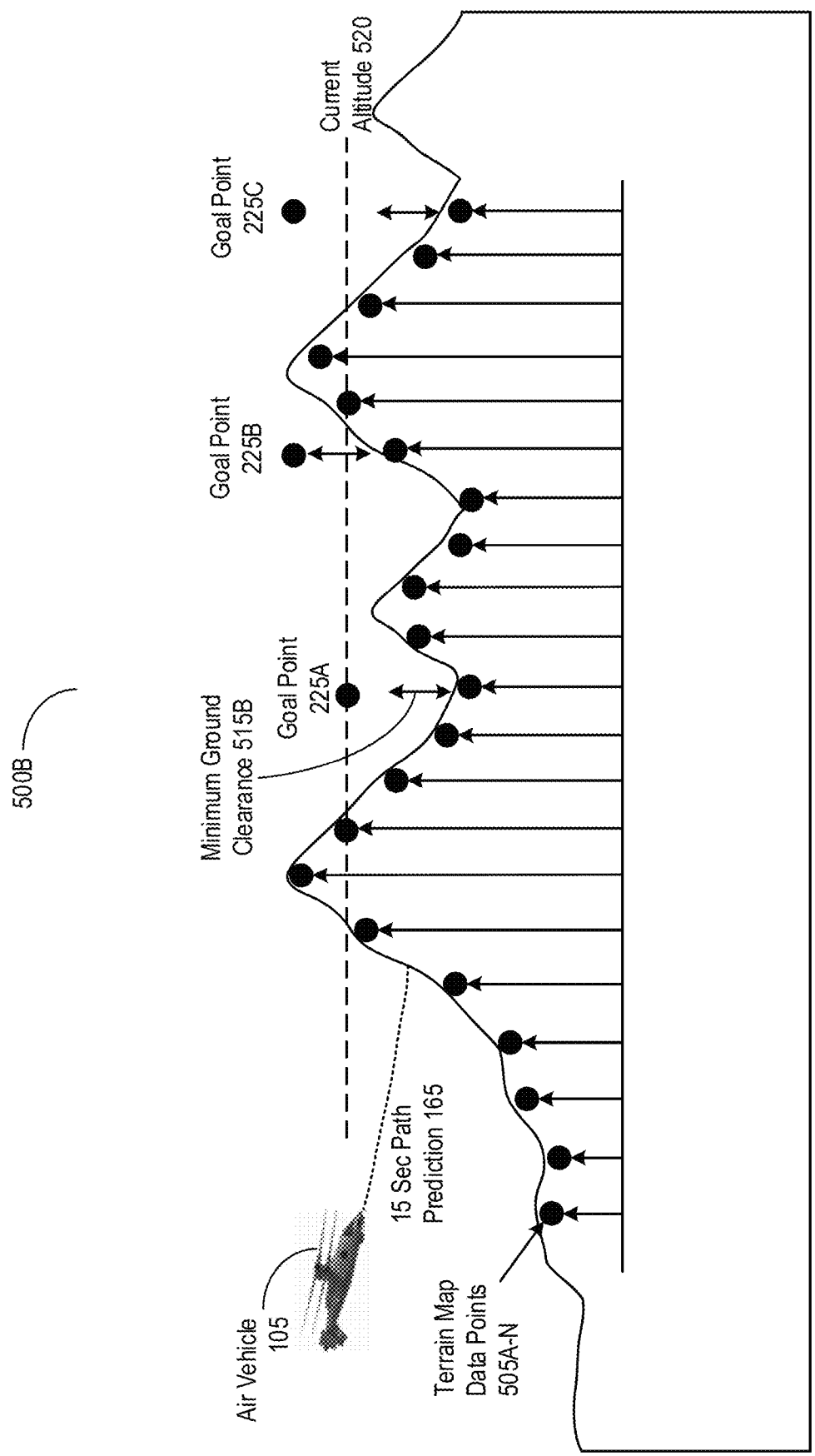

Referring to FIG. 5B, among others, depicted is an example of goal point generation 500B for terrain obstacle avoidance under high-speed mode. As with the previous example, in the depicted example, the path predictor 135 may have generated the predicted path 165 with a 15 second time window. The collision checker 140 may have determined that the predicted path 165 intersects with the terrain using data points 505 of the terrain map from the world model 220. In turn, the goal selector 145 may generate the set of goal points 225 based on a current position or altitude of the air vehicle 105 and the minimum ground clearance 515B (sometimes herein referred to as the clearance distance). The goal selector 145 may identify the current altitude 520 of the air vehicle 105 from the sensors on board. The goal points 225 generated by the goal selector 145 may have an altitude of at least the current altitude 520. If the current altitude 520 over an elevation of a data point 505 of the terrain map is less than the minimum ground clearance 515B, the goal selector 145 may set the goal point 225 (e.g., the goal point 225B) over the data point 505 to be at least the minimum ground clearance 515B over the elevation of the data point 505. The last goal point 225 (e.g., the goal point 225C) may have the same altitude as the penultimate goal point 225 (e.g., goal point 225B) to minimize altitude changes therefrom.

Figure 5C:
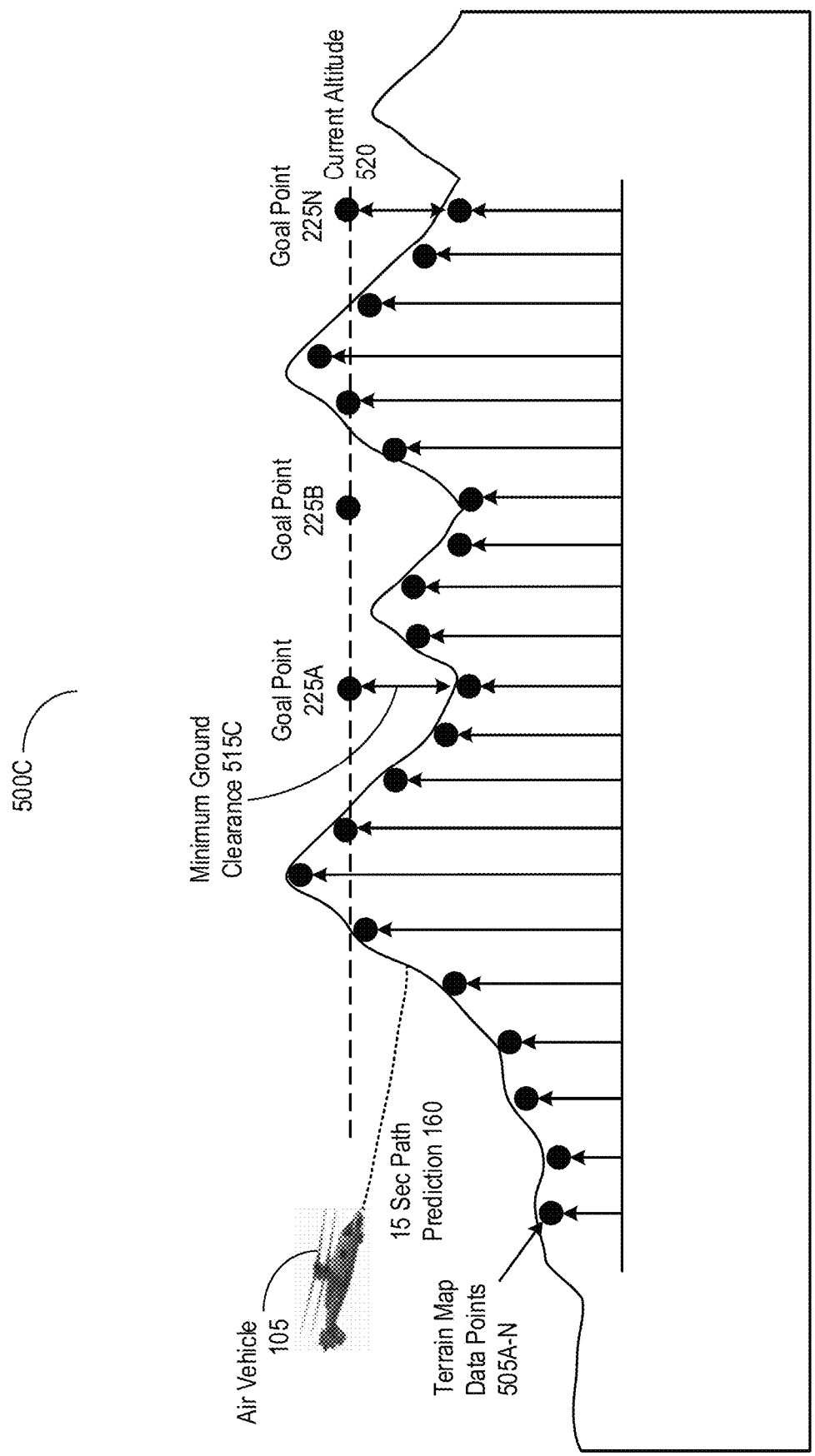

Referring to FIG. 5C, among others, depicted is an example of goal point generation 500C for terrain obstacle avoidance under high-speed mode. As with the previous example, in the depicted example, the path predictor 135 may have generated the predicted path 165 with a 15 second time window. The collision checker 140 may have determined that the predicted path 165 intersects with the terrain using data points 505 of the terrain map from the world model 220. In turn, the goal selector 145 may generate the set of goal points 225 to maintain the air vehicle 105 at the current altitude 520. The goal selector 145 may identify the current altitude 520 of the air vehicle 105 from the sensors on board. Each of the goal points 225 generated by goal selector 145 may have an altitude corresponding to the current altitude of the air vehicle 105. The goal points 225 may differ in geographic coordinates to avoid data points 505 of the terrain map with higher elevation than the current altitude 520.

In contrast, if the air vehicle 105 is identified as operating in a low-speed mode, the goal selector 145 may generate at least one goal point 225 to hover the air vehicle 105 relative to the obstacle in the environment. In some embodiments, the goal selector 145 may generate the goal point 225 to hold the air vehicle 105 over the obstacle by at least a clearance distance. The clearance distance may correspond to a distance (e.g., vertical or horizontal) between the obstacle and the position of the air vehicle 105, and may differ or be the same in value (e.g., between 0 to 100 ft) as the clearance margin discussed above. The goal point 225 may include at least one location (or point) for navigation the air vehicle 105 to hover relative to the obstacle in the environment. The goal point 225 may define or specify geographic coordinates (e.g., GPS coordinates), altitude, and orientation for the navigation of the air vehicle 105. The goal point 225 may be over a time window wider than the time window for the predicted path 165. For example, the time window for the set of goal points 225 may be 2 to 4 times longer than the time window for the predicted path 165. In some embodiments, the goal selector 145 may determine the goal point 225 based on the terrain of the environment from the world model 220. Examples of the goal points 225 generated when the air vehicle 105 is identified as operating in the low-speed mode are described herein below in conjunction with FIGS. 6A-C.

Figure 6A:
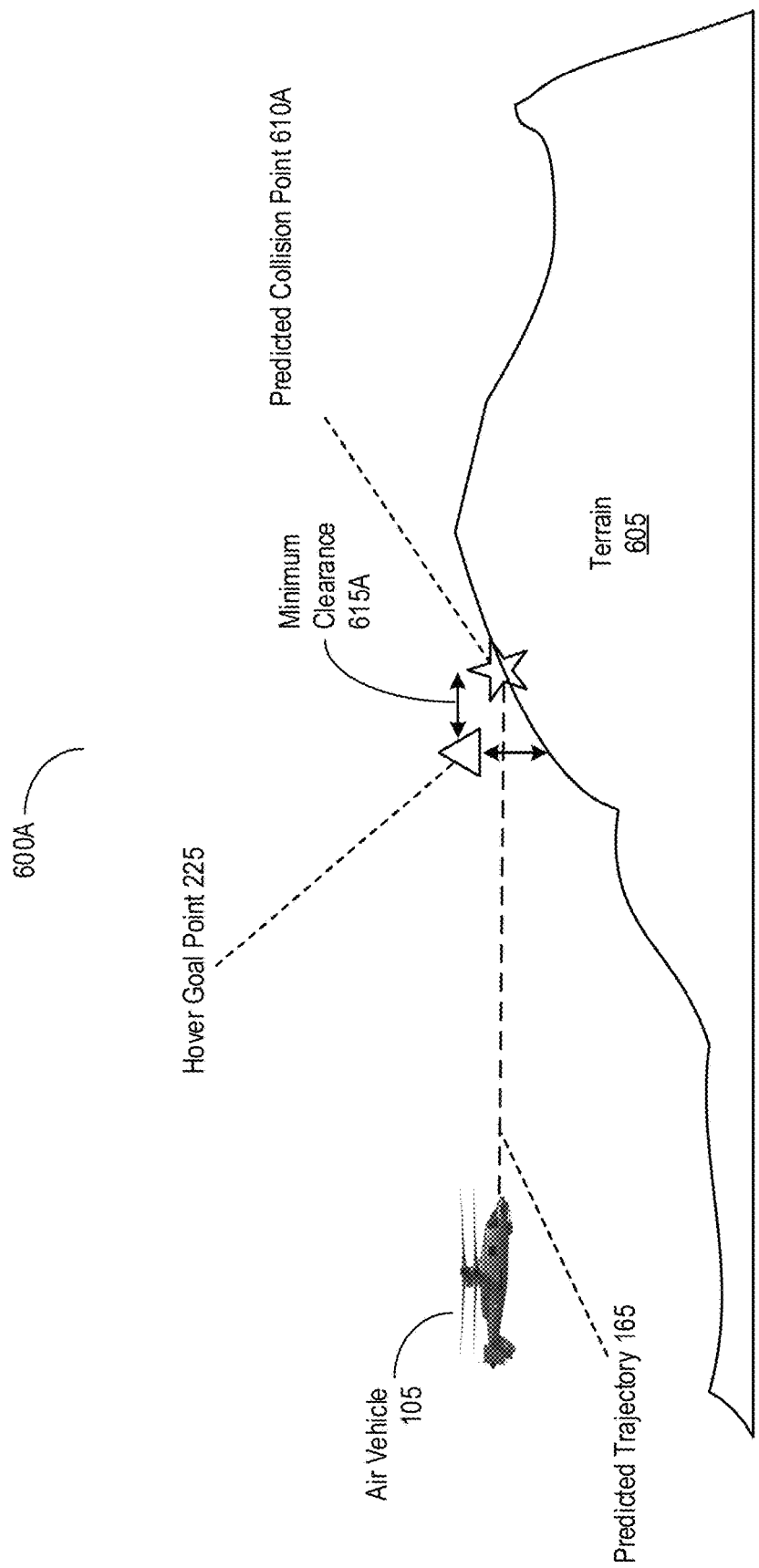
FIGS. 6A-C each illustrate a diagram of an example goal points selection for terrain obstacle avoidance in the system for controlling navigation under low-speed mode, in accordance with an illustrative embodiment.

Referring to FIG. 6A, among others, depicted is an example of goal point generation 600A for terrain obstacle avoidance under low-speed mode. In the depicted example, the path predictor 135 may have generated the predicted path 165 over a time window. The collision checker 140 may have determined that the predicted path 165 intersects with a terrain 605 at a predicted collision point 610A. The goal selector 145 may generate one or more goal points 225 to effectuate an avoidance trajectory 620. The goal selector 145 may use the elevation of the terrain 605 at the predicted collision point 610A to determine the goal points 225. At least one goal point 225 may be to hover the air vehicle 105 over the terrain 605 at the predicted collision point 610A by at least a minimum clearance 615A (sometimes herein referred to as a clearance distance).

Figure 6B:
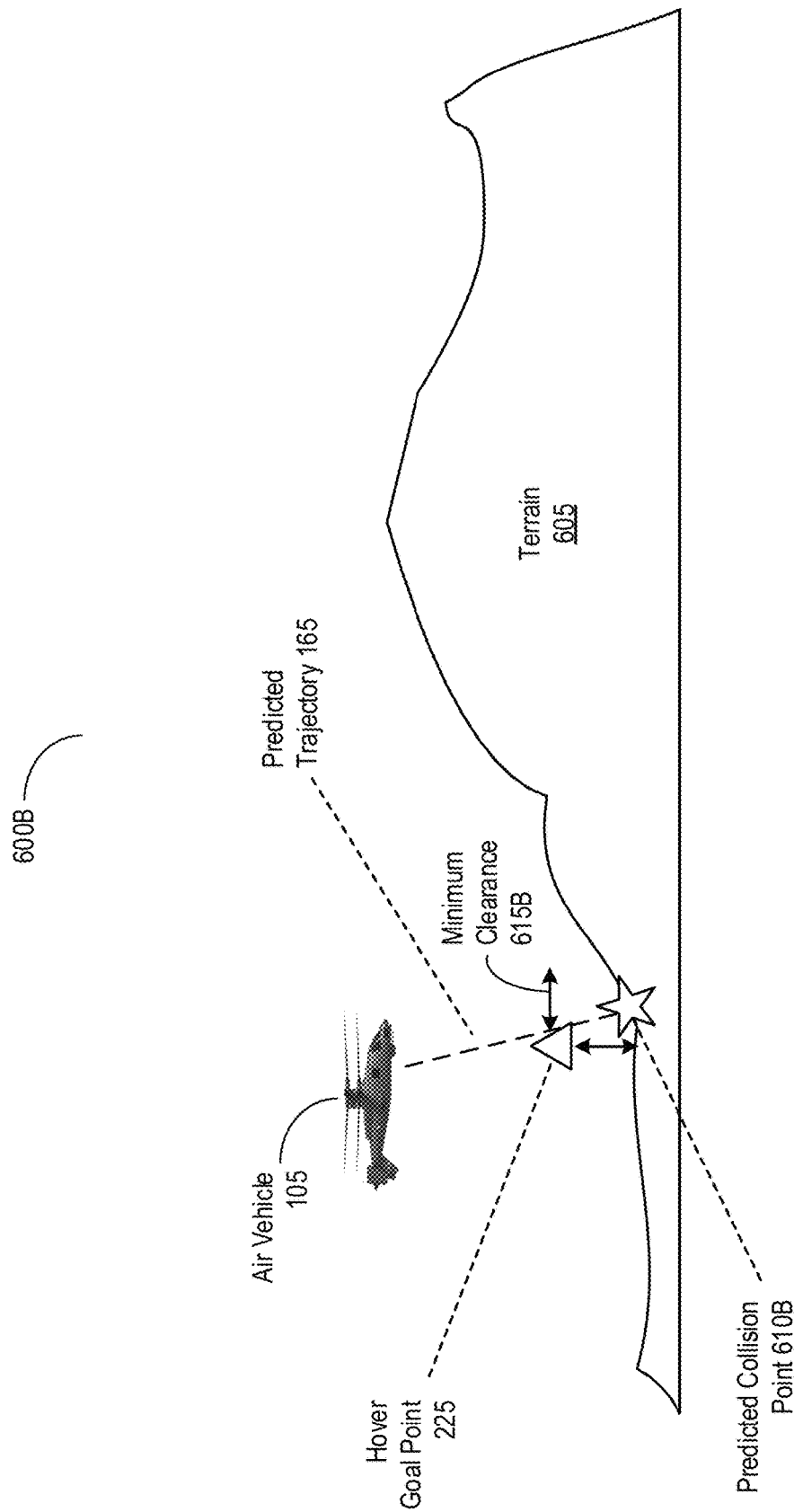

Referring to FIG. 6B, among others, depicted is an example of goal point generation 600B for terrain obstacle avoidance under low-speed mode. In the depicted example, the path predictor 135 may have generated the predicted path 165 over a time window. The collision checker 140 may have determined that the predicted path 165 intersects with a terrain 605 at a predicted collision point 610B. The goal selector 145 in turn can generate the goal point 225 to hold the air vehicle 105 relative to the terrain 605 by at least a minimum clearance 615B (sometimes herein referred to as a clearance distance). The goal selector 145 may use the elevation of the terrain 605 at the prediction collision point 610B to determine the goal point 225 by at least the minimum clearance 615B.

Figure 6C:
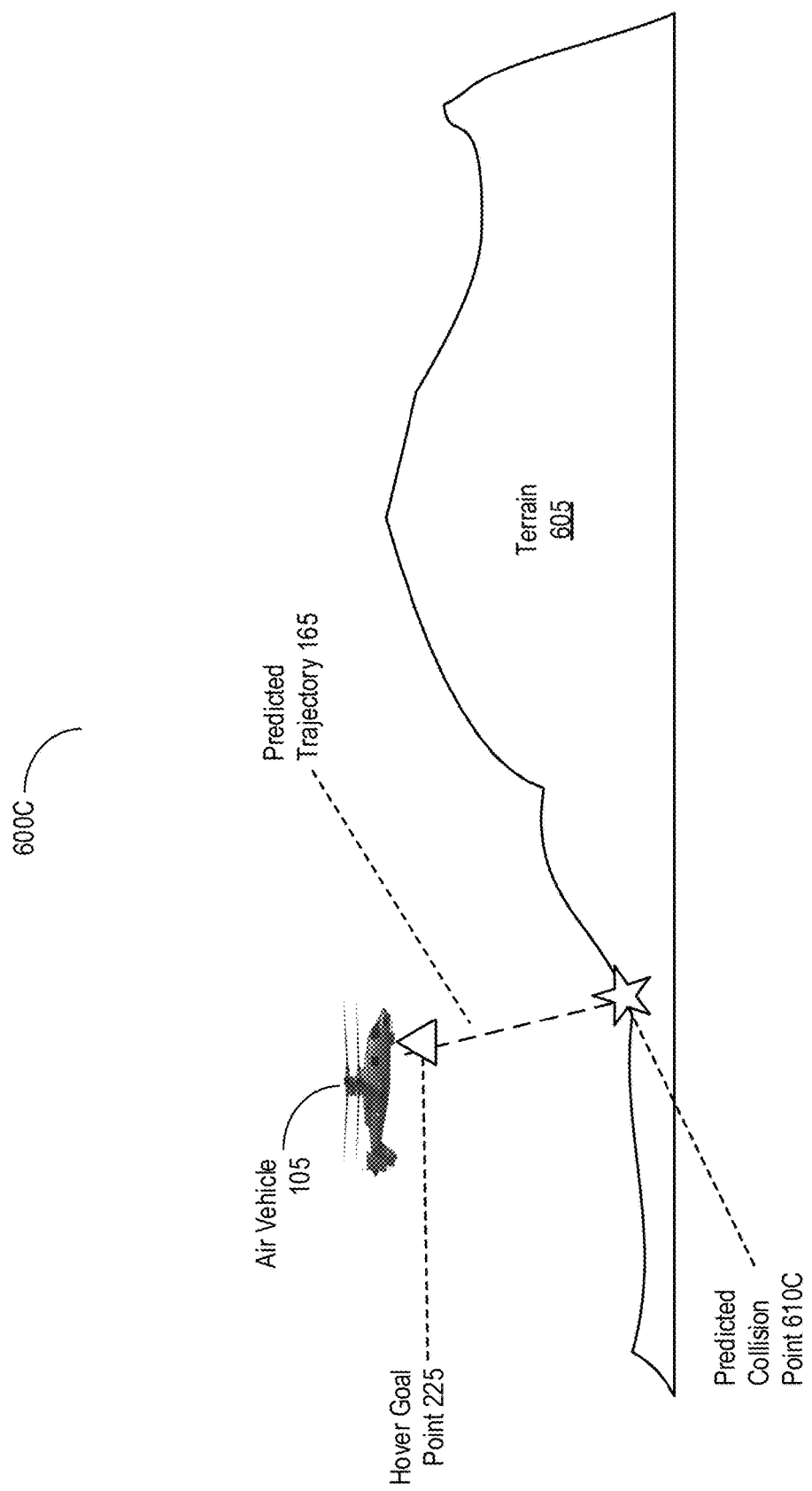

Referring to FIG. 6C, among others, depicted is an example of goal point generation 600C for terrain obstacle avoidance under low-speed mode. In the depicted example, the path predictor 135 may have generated the predicted path 165 over a time window. The collision checker 140 may have determined that the predicted path 165 intersects with a terrain 605 at a predicted collision point 610C. The goal selector 145 in turn can generate the goal point 225 to hold the air vehicle 105 relative to the terrain 605 at the current location of the air vehicle 105.

In some embodiments, the goal selector 145 may determine or generate a potential field map using the world model 220 for the environment. In some embodiments, the potential field map may be generated in accordance with a distance transform (e.g., Euclidean distance transformation (EDT)). The potential field map may be used by the goal selector 145 to generate the goal points 225 for terrain obstacle avoidance. The generation of the potential field map may be based on the identified portion of the environment, the location of the air vehicle 105, and the points of the predicted path 165. The potential field map may be defined in terms of geographic coordinates, and may identify whether the portion of the environment is occupied or free at a particular altitude (e.g., the altitude of the air vehicle 105) along the predicted path 165. The potential field map may identify that a geographic coordinate is occupied when the terrain has the elevation at least within a clearance margin of a particular altitude. To identify, the goal selector 145 may convert a distance transformation to the potential field map, and may select goal points 225 at local extrema (e.g., minima) of the potential field map. Conversely, the potential field map may identify that a geographic coordinate is free when the terrain has the elevation below the clearance margin of a particular altitude. Examples of the potential field map are shown and described herein on FIG. 7B.

Figure 7B:
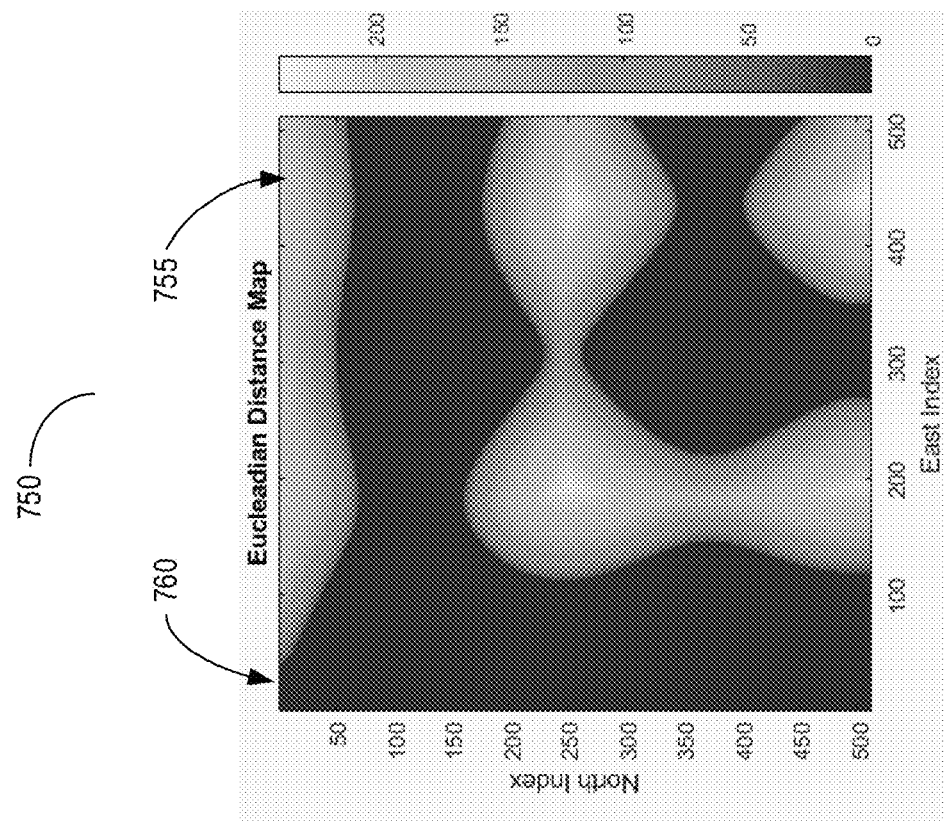
FIG. 7B illustrates a diagram of a potential field map used in determining terrain obstacle avoidance in the system for controlling navigation, in accordance with an illustrative embodiment.
Figure 7A:
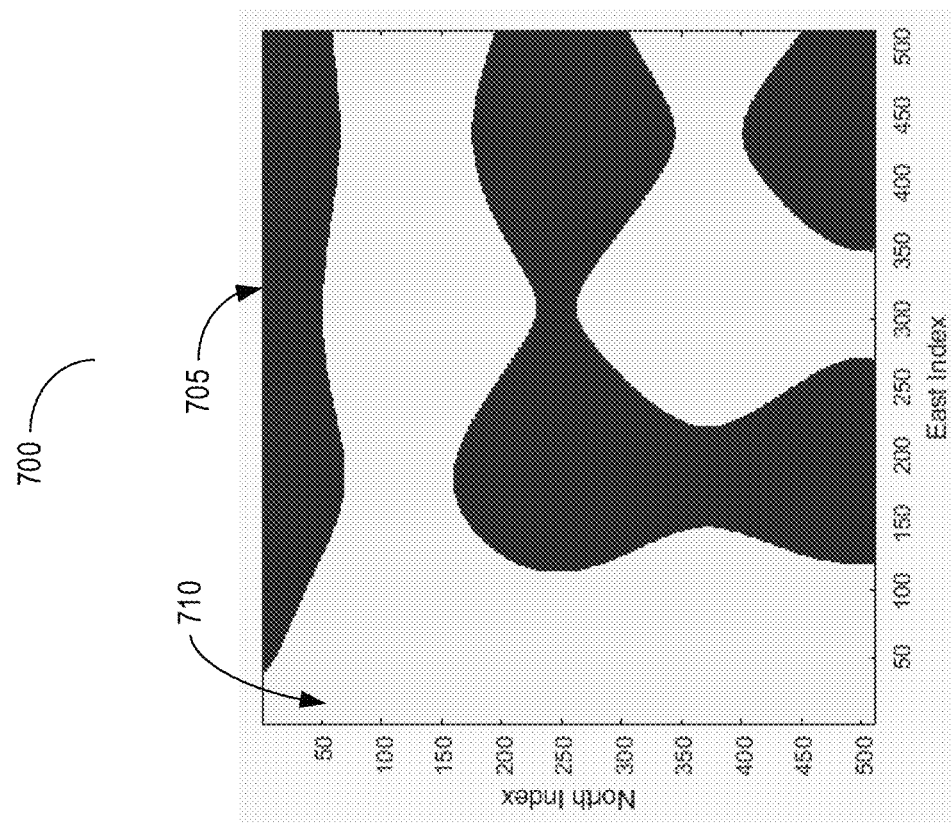
FIG. 7A illustrates a diagram of a slice of a terrain map at a current altitude of a vehicle for terrain obstacle avoidance in the system for controlling navigation, in accordance with an illustrative embodiment.

Referring to FIG. 7A, depicted is a diagram of a slice of a terrain map 700 used in determining terrain obstacle avoidance in the system 100 for controlling navigation. The terrain map 700 may be generated by the goal selector 145 from at least a portion of the terrain from world model 220. The terrain map 700 may have at least one free region 705 and at least one occupied region 710. The free region 705 may correspond to terrain having elevation below the clearance margin of the altitude of the air vehicle 105. The occupied region 710 may correspond to terrain having elevation within the clearance margin of the altitude of the air vehicle 105. In some embodiments, the terrain map 700 may be two-dimensional (e.g., as depicted) or three-dimensional.

Referring to FIG. 7B, depicted is a diagram of a potential field map 750 used in determining terrain obstacle avoidance in the system 100 for controlling navigation. In context, the goal selector 145 may generate the potential field map 750 using the terrain map 700 (e.g., via EDT). The potential field map 750 may be generated by the goal selector 145 from at least a portion of the terrain from the world model 220. The potential field map 750 may be two-dimensional (e.g., as depicted) or three-dimensional. The potential field map 750 may have at least one free region 755 and at least one occupied region 760. The free region 755 may correspond to terrain having elevation below the clearance margin of the altitude of the air vehicle 105. The free region 755 may also indicate an amount of difference between the clearance margin of the altitude of the air vehicle 105 and the elevation of the terrain in the environment. The occupied region 760 may correspond to terrain having elevation within the clearance margin of the altitude of the air vehicle 105. At any given point in that slice of the potential field map 750, the potential field map may indicate distance to the nearest obstacle (e.g., using a gradient map). In the potential field map 750, the darker the area, the closer the obstacle may be, whereas the lighter the area, the farther the obstacle may be. In some embodiments, the goal selector 145 may use the potential field map 750 to assign the goal points 225 over the terrain, and calculate the clearance to obstacles in the terrain.

Using the potential field map (e.g., the potential field map 700 or 750), the goal selector 145 may generate the goal points 225. From the potential field map, the goal selector 145 may identify a free region (e.g., the free region 705 or 755) and an occupied region (e.g., the occupied region 710 or 760) in the terrain of the environment. The goal selector 145 may assign the goal points 225 within the free region to avoid the occupied region in the environment. The goal points 225 may have geographic coordinates and altitudes as identified by the potential field map. In some embodiments, the goal selector 145 may use multiple potential field maps to determine the goal points 225. Each potential field map may be for a corresponding altitude. Within each potential field map, the goal selector 145 may identify the free region and the occupied region. The goal selector 145 may assign the goal points 225 within the free regions to avoid the occupied region at the corresponding altitudes. The set of goal points 225 generated by the goal selector 225 may have different altitudes.

Referring back to FIG. 2, the motion planner 150 may determine or generate a set of waypoints to navigate or direct the air vehicle 105 along the goal points 225 through the environment. The motion planner 150 may apply or otherwise use any motion planning algorithm to determine the waypoints. The motion planning algorithm may include, for example, a search-based planner (e.g., A* or D*), a sample-based planner (e.g., a rapidly-exploring random tree (RRT)), or model predictive control (MPC), among others. The waypoints may be along a terrain avoidance trajectory (e.g., as defined by the goal points 225) given the obstacle terrain environment and the constraints on the air vehicle 105 (e.g., a maximum turn rate). In some embodiments, the motion planner 150 may determine the set of waypoints for the set of goal point 225 to direct the air vehicle 105 to the goal point 225.

In some embodiments, the motion planner 150 may generate a set of command signals to carry out the terrain avoidance trajectory, when operating in an autonomous flight mode. The set of command signals may be to set or adjust the velocity (e.g., longitudinal, lateral, and vertical velocities), the acceleration (e.g., longitudinal, lateral, and vertical accelerations), and the orientation (e.g., roll, pitch, and yaw rates) at each waypoint for navigation of the air vehicle 105. The set of command signals may include a set of corresponding values to apply to set, configure, or modify the functioning of the navigation components 120. In some embodiments, the motion planner 150 may proceed to send, convey, or provide the set of command signals to the component controller 155, without any corrective input from the operator of the air vehicle 105. The motion planner 150 may switch the air vehicle 105 from a manual flight mode to an autonomy mode to the navigate the air vehicle 105 along the goal points 225. Under the autonomy mode, the air vehicle 105 may be directed along the goal points 225 to avoid the obstacle without any additional input from the operator.

In some embodiments, the motion planner 150 may present, display, or otherwise provide an output to an operator of the air vehicle 105 to navigate the air vehicle 105 along the one or more goal points 225 to avoid the obstacle in the environment. The motion planner 150 may present the output through the inceptors 115 or the interface 125 (e.g., a visual display in the air vehicle 105). The output may be in any modality, such as a visual cue (e.g., a graphical user interface such as a prompt), an audio cue (e.g., a sound prompting terrain avoidance), or a tactile cue (e.g., haptic feedback prompting terrain avoidance). Upon providing the output, the motion planner 150 may monitor for an interaction 230 with the inceptors 115 or the interface 125. The interaction 230 may include tactile input (e.g., acquired via a joystick, pedal, buttons, keyboard, or mouse), voice command (e.g., acquired via a microphone), or visual gesture (e.g., acquired via a camera), among others. The operator may accept or decline to direct the air vehicle 105 for an obstacle avoidance measure via the goal points 225, and the interaction 230 may indicate one of acceptance or rejection of the obstacle avoidance measure. In some embodiments, the motion planner 150 may determine acceptance or declination based on interaction 230 inputted via the inceptors 115. For example, when commands inputted via the inceptors 115 result in the predicted paths 165 that are clear from the terrain for sustained period of time (e.g., 5 to 45 seconds out), the motion planner 150 may determine that the input corresponds to a decline to the measure, without interaction with interface 125.

When the interaction 230 indicates that the operator declines the measure, the motion planner 150 may pass, convey, or otherwise send the original set of command signals to the component controller 155. By conveying the original set of command signals, the motion planner 150 may also invoke the operator maneuver loop 205 of the architecture 200 for the flight control computing system 110. The operations of the flight control computing system 110 may be in accordance with the operator maneuver loop 205 as discussed above. Otherwise, when the interaction 230 indicates that the operator accepts the measure, the motion planner 150 may pass, convey, or otherwise send the set of waypoints for the terrain avoidance trajectory to direct the air vehicle 105 along the goal points 225 in the environment. The motion planner 150 may also continue along the terrain avoidance loop 210 of the flight control computing system 110.

The component controller 155 may perform an action to direct the air vehicle 105 along the one or more goal points 225 to avoid the obstacle. The component controller 155 may perform the action in accordance with the set of waypoints generated by the motion planner 150 to carry out the goal points 225. In some embodiments, the component controller 155 may generate a set of command signals (e.g., as discussed above) based on the waypoints generated by the motion planner 150 to perform the action in carrying out the goal points 225. The functionality of the component controller 155 with respect to the set of command signals for the goal points 225 may be similar to the functionality of the component controller 155 as with the predicted path 165 detailed above. In some embodiments, the component control 155 may perform the action to direct the air vehicle 105 along the one or more goal points 225 avoid the obstacle, upon switching from a manual flight mode (sometimes herein referred to as a hand flying mode) to the autonomy mode. In performing the action, the component controller 155 may convert the set of waypoints to actuator control signals to control the navigation components 120.

In this manner, using the reduced-order closed-loop model 360, the flight control computing system 110 may be able to more quickly generate predicted paths 165 using the command signals inputted via the inceptors 115, relative to the full-order architecture 300. Furthermore, because of this, the outputted predicted paths 165 may be suitable for use for a terrain obstacle avoidance. The flight control computing system 110 may determine whether the predicted path 165 that the air vehicle 105 is navigating along intersects with the obstacle in the environment. In this manner, the utility of the flight control computing system 110 may be further expanded to trajectory prediction and the obstacle avoidance, thereby increasing the odds of accomplishing the mission objectives of the flight.

Figure 8:
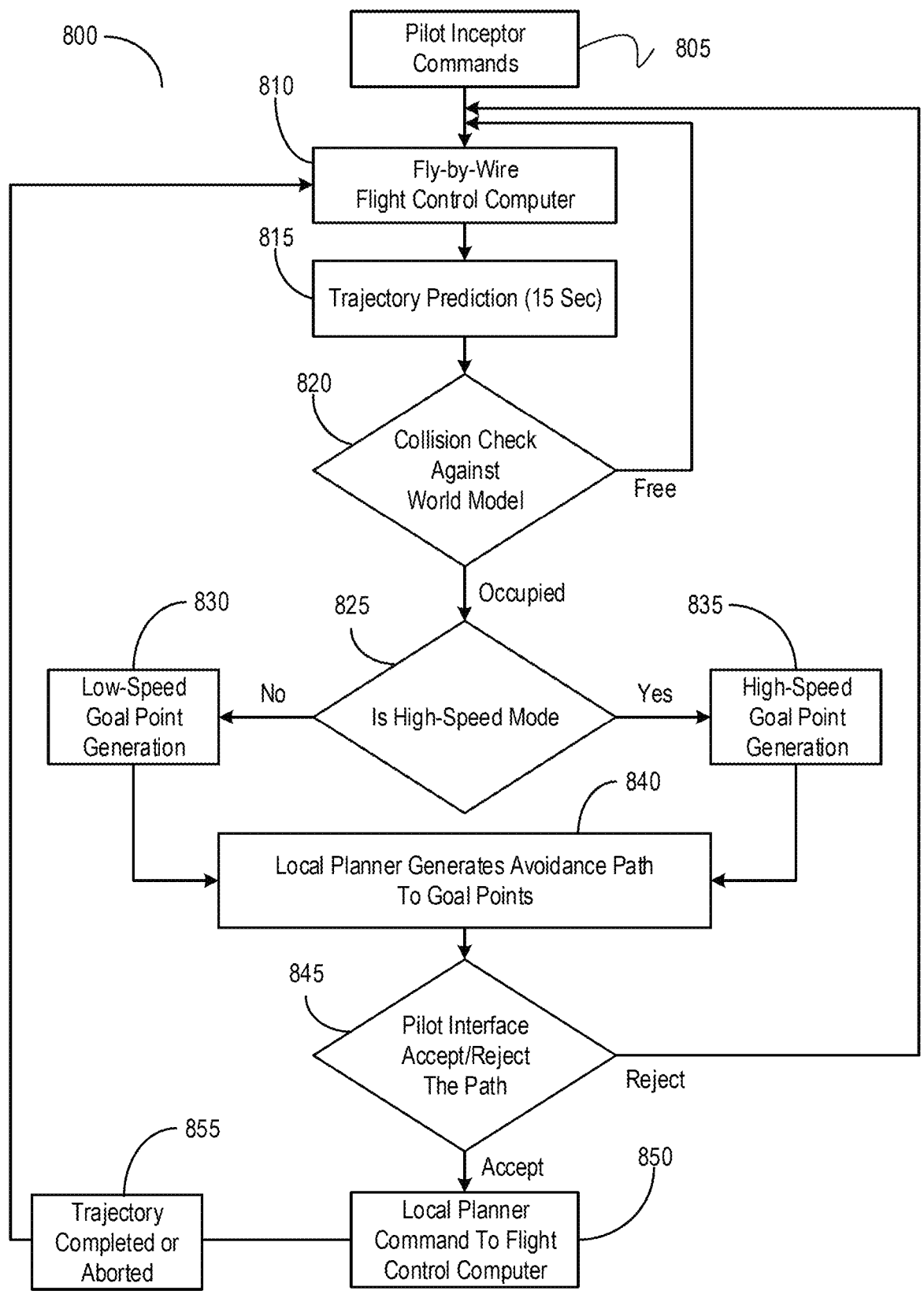
FIG. 8 illustrates a flow diagram of a process of controlling navigation, in accordance with an illustrative embodiment.

FIG. 8 illustrates a flow diagram of a process 800 of controlling navigation. The process 800 may be performed by or implemented using any of the components detailed above with respect to FIGS. 1-7C or with the components described in FIG. 10. Under the process 800, a computing system may receive pilot inceptor commands (805). The computing system may perform fly-by-wire using a flight control computer (810). The computing system may perform trajectory prediction with a 15 second time window (815). The computing system may determine check for a collision against a world model (820). If there are no predicted collisions with an obstacle occupying the terrain, the computing system may repeat from step (810). Otherwise, if there is a predicted collision with an obstacle occupying the terrain, the computing system may determine whether the air vehicle is operating in a high-speed mode (825).

Continuing on, when the air vehicle is determined to be not operating in the high-speed mode, the computing system may use low-speed goal point generation (830). Conversely, when the air vehicle is determined to be operating in the high-speed mode, the computing system may use high-speed goal point generation (835). The computing system may invoke a local planner to generate avoidance path to goal points (840). The computing system may determine whether an acceptance or rejection of the path is indicated via a pilot interface or an interface (845). If the path is rejected, the computing system may repeat the fly-by-wire controls from step (810). Otherwise, if the avoidance path is accepted, the computing system may use the local planner command to flight control computer (850). The computing system may complete or abort the trajectory (855), and then repeat the fly-by-wire controls from step (810).

Figure 9:
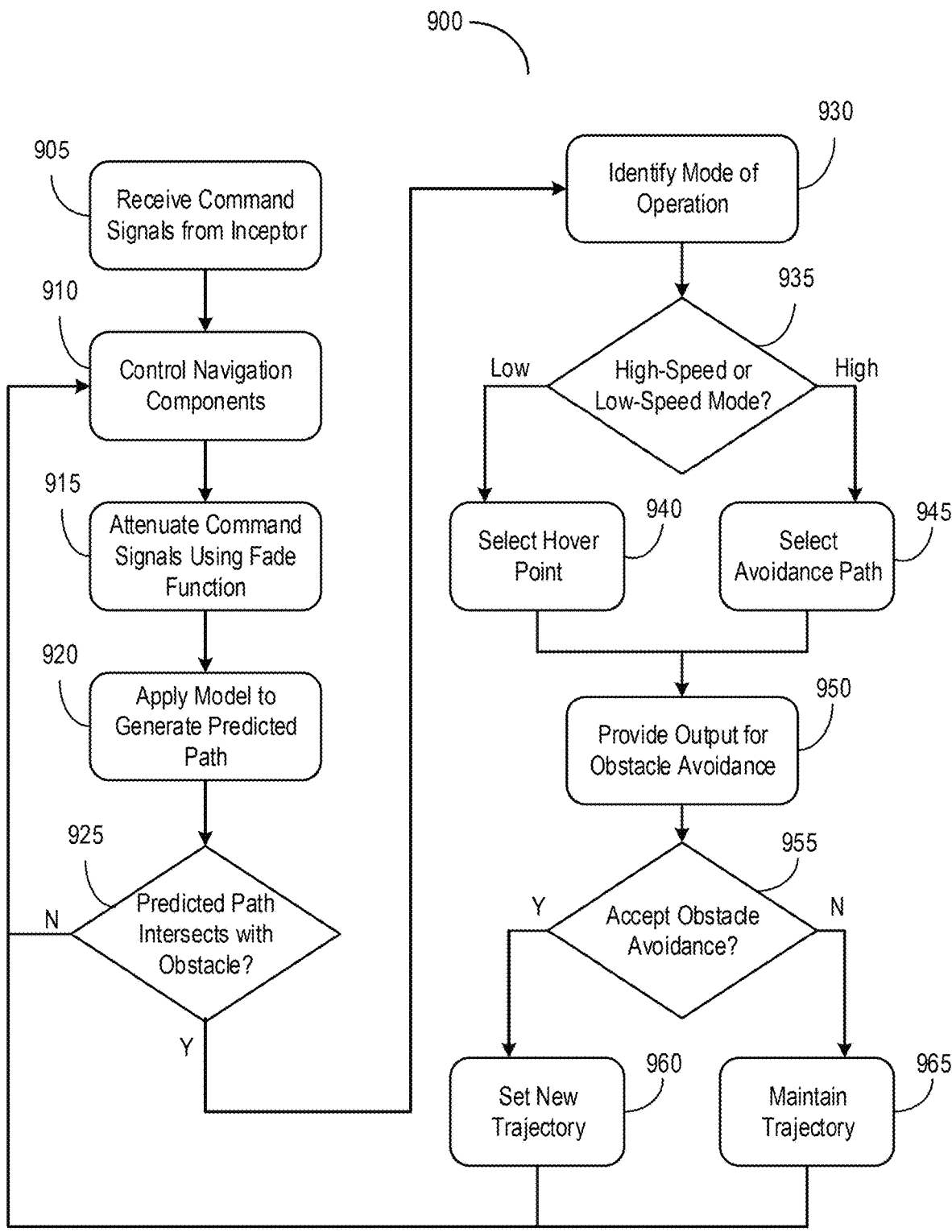
FIG. 9 illustrates a flow diagram of a method of controlling navigation of vehicles, in accordance with an illustrative embodiment.

FIG. 9 illustrates a flow diagram of a method 900 of controlling navigation of vehicles. The method 900 may be performed by or implemented using any of the components detailed above with respect to FIGS. 1-7C or with the components described in FIG. 10. Under the method 900, a computing system (e.g., a flight control computing system 110) may receive command signals from inceptors (e.g., the inceptors 115) (905). The command signals may be to set or adjust the velocity (e.g., longitudinal, lateral, and vertical velocities), the acceleration (e.g., longitudinal, lateral, and vertical accelerations), and the orientation (e.g., roll, pitch, and yaw rates) for navigation of an aircraft (e.g., the air vehicle 105). The computing system may control navigation components (e.g., the navigation components 120) (910). The computing system may convert the received command signals to actuate control signals to apply to the navigation components.

The computing system may attenuate command signals using fade function (e.g., the fade function 405) (915). The fade function may be applied to at least a subset of the command signals, and may reduce a value or amplitude of a corresponding command signal over a prediction horizon relative a time point at which the command signal was received. The computing system may apply the command signals to a model (e.g., the path prediction model 160) to generate a predicted path (e.g., the predicted path 165) (920). The model may have one or more functions, such as a reduced-order closed loop model (e.g., the reduced-order closed-loop model 360). The predicted path may specify a route via which the aircraft is to navigate from a current location to another point forward in time over the prediction horizon.

The computing system may determine whether the predicted path intersects with an obstacle (925). To determine, the computing system may compare the predicted path with a terrain map from a world model (e.g., the world model 220). The predicted path may have one or more points defined in terms of geographic coordinates and altitude for the aircraft. For each point in the predicted path, the computing system may check the altitude for the aircraft against the elevation of the terrain at the corresponding geographic coordinate. If the elevation is greater than the altitude, the computing system may determine that the predicted path intersects. Conversely, if the elevation is less than the altitude, the computing system may determine that predicted path does not intersect. If the predicted path is determined to not intersect with the obstacle, the computing system may repeat from step (900).

Otherwise, if the predicted path is determined to intersect with the obstacle, the computing system may identify a mode of operation (930). The mode of operation may include a low-speed mode and a high-speed mode. The computing system may identify a speed of the aircraft. The computing system may determine whether the mode of operation is a high-speed mode or a low-speed mode (935). If the speed is less than a threshold, the computing system may determine that the aircraft is operating in a low-speed mode. Otherwise, the computing system may determine that the aircraft is operating in a high-speed mode.

When in the low-speed mode, the computing system may select a hover point (940). The computing system may generate a goal point (e.g., the goal point 225 from examples 600A-C) to hover the aircraft relative to the obstacle in the terrain by at least a minimum clearance distance (e.g., the minimum clearance 625A or 625B). When in the high-speed mode, the computing system may select an avoidance path (945). The avoidance path may be formed by a set of goal points (e.g., the goal points 225 from examples 500A-C). The path may be to guide the aircraft through the environment to avoid the obstacle.

The computing system may provide output for obstacle avoidance (950). The output may prompt an operator of the aircraft to accept or reject the obstacle avoidance measure to direct the aircraft. The output may provide terrain rendering and aircraft location for situational awareness. Combining with visual and verbal directional cue, the operator may make decision whether to hand fly the avoidance path or allow the autonomous system to take control. The computing system may determine whether the obstacle avoidance is accepted (955). The computing system may monitor for operator input indicating acceptance or rejection of the obstacle avoidance measure. When the input indicates acceptance, the computing system may determine that the operator accepts the avoidance measure. Otherwise, when the input indicates rejection, the computing system may determine that the operator has rejected the avoidance measure.

If the avoidance is accepted, the computing system may set the new trajectory (960). The computing system may generate a new set of command signals to effectuate the terrain obstacle avoidance using the goal points. The computing system may also switch from a manual flight mode to autonomy mode, without any further input from the operator. In contrast, if the avoidance is not accepted, the computing system may maintain the trajectory (965). The computing system may use the original command signals to direct navigation. The computing system may also keep the aircraft in the manual flight mode.

Figure 10:
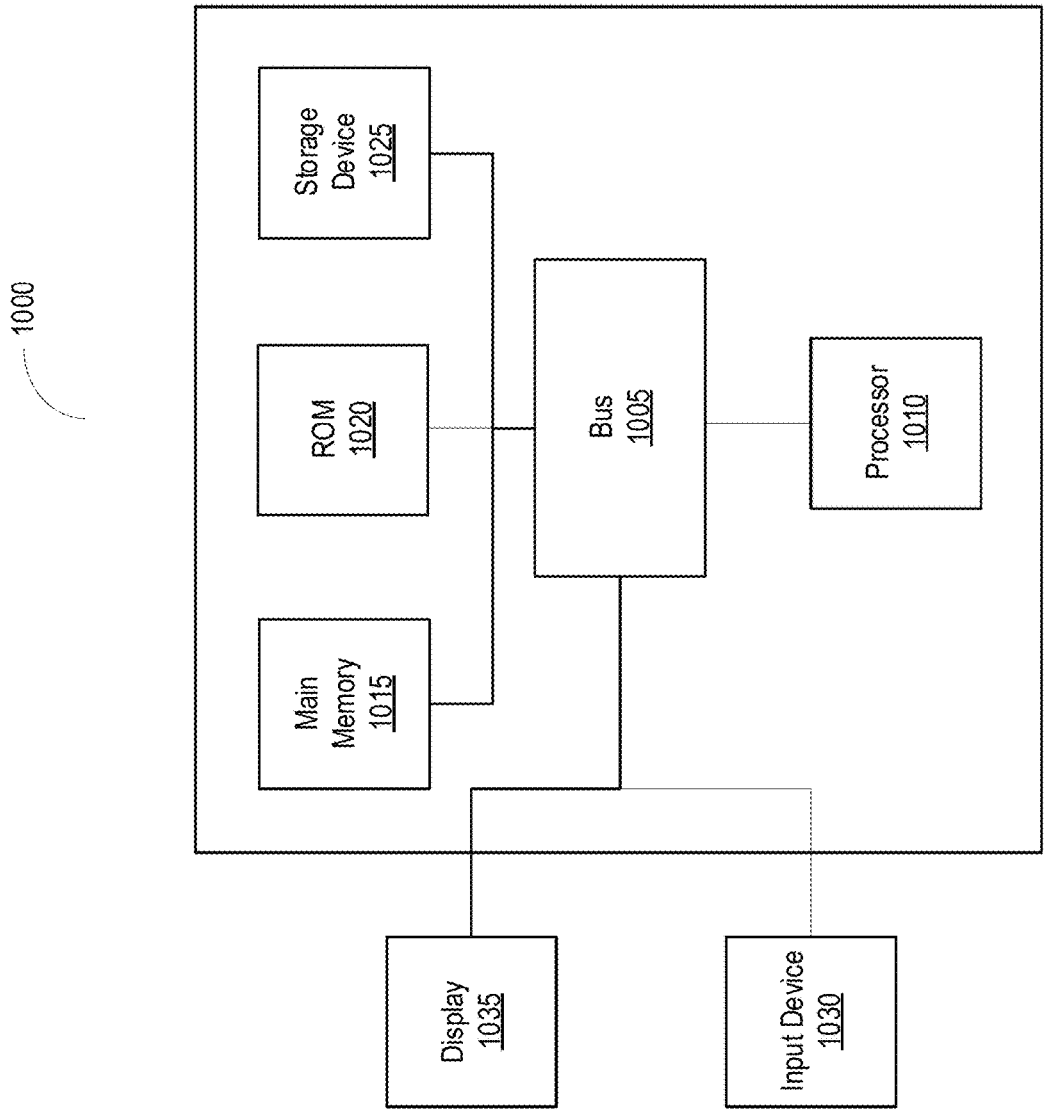
FIG. 10 illustrates a block diagram of an example computer system useful in implementing one or more components detailed herein.

Referring to FIG. 10, depicted is a block diagram of an example computer system 1000. The computer system or computing device 1000 can include or be used to implement the system 100, or its components such as the flight control computing system 110 (including the inceptor processor 130, the path predictor 135, the collision checker 140, the goal selector 145, the motion planner 150, the component controller 155, and the path prediction model 160), and the interface 125, among others. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1035, such as a liquid crystal display, or active matrix display, for displaying information to a user such as an administrator of the data processing system. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035. The display 1035 can be part of a component of FIG. 1, such as the interface 125.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of controlling an aircraft, comprising:
   identifying, by a computing system on an aircraft, a first plurality of command signals derived from an input received from one or more inceptors at a time point to control navigation of the aircraft through an environment;
   attenuating, by the computing system, the first plurality of command signals using a fade function over a time window relative to the time point the input is received from the one or more inceptors to generate a second plurality of command signals;
   inputting, by the computing system, the second plurality of command signals generated by the fade function to a reduced order model related to a full order architecture to generate one or more predicted paths for the aircraft through the environment over the time window;
   determining, by the computing system, that at least one predicted path of the one or more predicted paths intersects with an obstacle in the environment during the time window;
   generating, by the computing system, a location to which to navigate the aircraft to avoid the obstacle responsive to determining that the at least one predicted path intersects with the obstacle; and
   performing, by the computing system, an action to direct the aircraft to the location.

2. The method of claim 1, wherein the reduced order model is configured to approximate at least one of an inverse plant model, a corrective feedback model, a control mixing model, or a servos control unit in a flight control system for the aircraft.

3. The method of claim 1, wherein inputting the second plurality of command signals further comprises inputting the second plurality of command signals to the reduced order model, at an interval of time, to generate the one or more predicted paths for the aircraft through the environment.

4. The method of claim 1, wherein determining that the at least one predicted path intersects the obstacle further comprises comparing the at least one predicted path for the aircraft with a world model for the environment.

5. The method of claim 1, further comprising identifying, by the computing system, whether the aircraft is operating in at least one of a first mode or a second mode based on a speed of the aircraft, responsive to determining that the at least one predicted path intersects with the obstacle.

6. The method of claim 1, further comprising generating, by the computing system, a potential field map using a world model for the environment, the potential field map identifying whether the environment is occupied or free at an altitude of the aircraft.

7. The method of claim 1, wherein generating the location further comprises generating the location to hover the aircraft relative to the obstacle in the environment, responsive to a speed of the aircraft being below a threshold.

8. The method of claim 1, wherein generating the location further comprises generating a plurality of waypoints through which to navigate the aircraft to evade the obstacle by at least a clearance distance, responsive to a speed of the aircraft being above a threshold.

9. The method of claim 1, wherein performing the action further comprises providing an output to an operator of the aircraft to navigate the aircraft to the location to avoid the obstacle, the output including at least one of a visual cue, an audio cue, or a tactile cue.

10. The method of claim 1, wherein performing the action further comprises switching, without corrective input to avoid the obstacle from an operator of the aircraft, the aircraft from a manual flight mode to an autonomy flight mode to navigate the aircraft to the location to avoid the obstacle.

11. A system for controlling an aircraft, comprising:
a computing system having one or more processors coupled with memory on an aircraft, the computing system configured to:
identify a first plurality of command signals derived from an input received from one or more inceptors at a time point to control navigation of the aircraft through an environment;
attenuate the first plurality of command signals using a fade function over a time window relative to the time point the input is received from the one or more inceptors to generate a second plurality of command signals;
input the second plurality of command signals generated by the fade function to a reduced order model related to a full order architecture to generate one or more predicted paths for the aircraft through the environment over the time window;
determine that at least one predicted path of the one or more predicted paths intersects with an obstacle in the environment during the time window;
generate a location to which to navigate the aircraft to avoid the obstacle responsive to determining that the at least one predicted path intersects with the obstacle; and
perform an action to direct the aircraft to the location.

12. The system of claim 11, wherein the reduced order model is configured to approximate at least one of an inverse plant model, a corrective feedback model, a control mixing model, or a servos control unit in a flight control system for the aircraft.

13. The system of claim 11, wherein the computing system is further configured to input the second plurality of command signals to the reduced order model, at an interval of time, to generate the one or more predicted paths for the aircraft through the environment.

14. The system of claim 11, wherein the computing system is further configured to compare the at least one predicted path for the aircraft with a world model for the environment to determine that the at least one predicted path intersects the obstacle.

15. The system of claim 11, wherein the computing system is further configured to identify whether the aircraft is operating in at least one of a first mode or a second mode based on a speed of the aircraft, responsive to determining that the at least one predicted path intersects with the obstacle.

16. The system of claim 11, wherein the computing system is further configured to generate a potential field map using a world model for the environment, the potential field map identifying whether the environment is occupied or free at an altitude of the aircraft.

17. The system of claim 11, wherein the computing system is further configured to generate the location to hover the aircraft relative to the obstacle in the environment, responsive to a speed of the aircraft being below a threshold.

18. The system of claim 11, wherein the computing system is further configured to generate a plurality of waypoints through which to navigate the aircraft to evade the obstacle by at least a clearance distance, responsive to a speed of the aircraft being above a threshold.

19. The system of claim 11, wherein the computing system is further configured to provide an output to an operator of the aircraft to navigate the aircraft to the location to avoid the obstacle, the output including at least one of a visual cue, an audio cue, or a tactile cue.

20. The system of claim 11, wherein the computing system is further configured to switch, without corrective input to avoid the obstacle from an operator of the aircraft, the aircraft from a manual flight mode to an autonomy flight mode to navigate the aircraft to the location to avoid the obstacle.

* * * * *